United States Patent
Hartley et al.

(10) Patent No.: US 11,637,815 B1
(45) Date of Patent: *Apr. 25, 2023

(54) SYSTEMS AND METHODS FOR ENCRYPTING DATA IN TRANSIT

(71) Applicant: ARCHITECTURE TECHNOLOGY CORPORATION, Eden Prairie, MN (US)

(72) Inventors: Timothy Hartley, Eden Prairie, MN (US); Deborah Charan, Eden Prairie, MN (US); Ranga S. Ramanujan, Eden Prairie, MN (US)

(73) Assignee: ARCHITECTURE TECHNOLOGY CORPORATION, Eden Prairie, MN (US)

(*) Notice: Subject to any disclaimer, the term of this patent is extended or adjusted under 35 U.S.C. 154(b) by 36 days.

This patent is subject to a terminal disclaimer.

(21) Appl. No.: 17/171,436

(22) Filed: Feb. 9, 2021

Related U.S. Application Data

(63) Continuation of application No. 15/975,580, filed on May 9, 2018, now Pat. No. 10,979,402.

(51) Int. Cl.
*H04W 12/02* (2009.01)
*H04L 9/40* (2022.01)
(Continued)

(52) U.S. Cl.
CPC ........ *H04L 63/0428* (2013.01); *G06F 21/602* (2013.01); *H04L 47/2441* (2013.01);
(Continued)

(58) Field of Classification Search
None
See application file for complete search history.

(56) References Cited

U.S. PATENT DOCUMENTS

| 6,618,397 B1 * | 9/2003 | Huang | H04L 69/04 370/392 |
|---|---|---|---|
| 7,215,667 B1 | 5/2007 | Davis | |

(Continued)

OTHER PUBLICATIONS

Architecture Technology Corporation, Proposal No. F172-009-0185, Topic No. AF172-009, 1, Identification and Significance of the Problem or Opportunity, Jun. 21, 2017, 11 pages.

(Continued)

*Primary Examiner* — Alex Skripnikov
*Assistant Examiner* — Pamit Kaur
(74) *Attorney, Agent, or Firm* — Foley & Lardner LLP

(57) ABSTRACT

Disclosed herein are embodiments of systems, methods, and products comprising a computing device, which provides Efficient Data-In-Transit Protection Techniques for Handheld Devices (EDITH) to protect data-in-transit. An end user device (EUD) may generate a multicast data packet. The EDITH module of the EUD encapsulates the data packet in a GRE packet and directs the GRE packet to a unicast destination address of an EDITH Multicast Router included in an infrastructure. The EDITH module on the EUD double compresses and double encrypts the GRE packet. The EDITH module on the infrastructure decrypts and decompresses the double compressed and double encrypted GRE packet to recreate the GRE packet. The EDITH module on the infrastructure decapsulates the GRE packet to derive the original multicast data packet, and distributes the original multicast data packet to the multiple group member based on the multicast destination address included in the original multicast data packet.

20 Claims, 12 Drawing Sheets

(51) Int. Cl.
*H04L 69/22* (2022.01)
*H04L 49/201* (2022.01)
*H04L 47/2441* (2022.01)
*H04W 4/06* (2009.01)
*G06F 21/60* (2013.01)
*H04L 69/04* (2022.01)
*H04L 45/16* (2022.01)

(52) U.S. Cl.
CPC ........ *H04L 49/201* (2013.01); *H04L 63/0272* (2013.01); *H04L 69/22* (2013.01); *H04W 4/06* (2013.01); *H04W 12/02* (2013.01); *H04L 45/16* (2013.01); *H04L 69/04* (2013.01)

(56) References Cited

U.S. PATENT DOCUMENTS

| | | |
|---|---|---|
| 7,768,913 B1 | 8/2010 | Shepherd et al. |
| 8,745,185 B1 | 6/2014 | Salo |
| 9,100,457 B2 | 8/2015 | Hsu |
| 10,979,402 B1* | 4/2021 | Hartley ............... H04L 63/0272 |
| 2005/0198367 A1 | 9/2005 | Ettikan |
| 2010/0189103 A1 | 7/2010 | Bachmann et al. |
| 2010/0260098 A1* | 10/2010 | Ulupinar ................ H04L 69/04 370/315 |
| 2011/0016313 A1 | 1/2011 | Jin et al. |
| 2011/0122893 A1 | 5/2011 | Kang et al. |
| 2012/0144191 A1* | 6/2012 | Lebovitz ............... H04L 63/065 713/163 |
| 2015/0110131 A1 | 4/2015 | Roskind |
| 2016/0081079 A1* | 3/2016 | Kneckt ............... H04W 72/005 370/329 |
| 2016/0292446 A1 | 10/2016 | Lawrence |
| 2017/0055178 A1 | 2/2017 | Seshadri et al. |
| 2017/0264716 A1 | 9/2017 | Bertz et al. |
| 2017/0359718 A1* | 12/2017 | Denny ................ H04L 9/0861 |
| 2019/0207747 A1 | 7/2019 | Durvasula et al. |
| 2019/0320014 A1* | 10/2019 | Allen ................ H04N 21/2347 |

OTHER PUBLICATIONS

Architecture Technology Corporation, Final Report, Topic No. N162-073, M67854-17-P-6513, Jun. 18, 2017, 35 pages.

* cited by examiner

SYSTEMS AND METHODS FOR ENCRYPTING DATA IN TRANSIT

CROSS REFERENCE TO RELATED APPLICATIONS

This application is a continuation of U.S. patent application Ser. No. 15/975,580, filed May 9, 2018, which is incorporated by reference in its entirety.

This application is related to U.S. patent application Ser. No. 15/975,610, entitled "Systems and Methods for Secure Data Transport," filed May 9, 2018, which is incorporated by reference in its entirety.

This invention was made with government support under contract number M67854-17-P-6513 awarded by Department of Defense, Marine Corps Systems Command (MARCORSYSCOM). The government has certain rights in the invention.

TECHNICAL FIELD

This application relates generally to methods and systems for efficient data-in-transit protection.

BACKGROUND

An end-to-end data-in-transit protection solution may need to meet the following requirements while operating over a bandwidth-constrained tactical Internet protocol (IP) network environment: (1) protect classified information as it travels from a warfighter's handheld computing device, such as a smartphone or tablet, over an untrusted or lower classification level tactical radio network; (2) operate over waveform-diverse network, i.e., agnostic to the network used; (3) provide protection for multicast transmissions; (4) certifiable for use in Android and Windows and other software environments; (5) minimize network overhead of protection technique—desired goal is 6% packet overhead or less; (6) be certifiable through the CSfC process; (7) support for quality of service (QoS)-based operations; and (8) enable multiple security level operation.

The realization of protection solution compliant with the National Security Agency's (NSA) Commercial Solution for Classified (CSfC) Mobile Access Capability Package (MA CP) addressing these requirements is currently not possible. This is because the two-layered encryption solution mandated by the MA CP must be composed by selecting certified inner and outer layer encryption components (i.e., VPN Clients, VPN Gateways) from the CSfC Components List maintained by the NSA. Existing CSfC-qualified VPN Clients and VPN Gateway products on this list lack the capabilities, such as multicast support, bandwidth-efficient operation, and QoS support, which are required to build an end-to-end MA CP solution for mission applications.

SUMMARY

What is therefore desired is a data-in-transit protection method that overcomes the limitations of the existing products, and ensures data security with low network overhead. Embodiments disclosed herein describe Efficient Data-In-Transit Protection Techniques for Handheld Devices (EDITH) for implementing Internet Protocol Security (IPsec) Virtual Private Network (VPN) clients and VPN gateways using three innovative techniques, e.g., (1) bandwidth-efficient IPsec packet framing, which cuts total packet overhead for a 1000 byte payload from 14% for traditional encryptors to less than 6%; (2) CSfC-qualifiable secure multicast; and (3) differentiated services code point (DSCP) pass-through for QoS support.

The EDITH approach for protecting data-in-transit may provide a number of benefits including rapid induction of the latest commercial technologies and capabilities into military systems, logistics and lifecycle efficiencies accruing from the use of non-Controlled Cryptographic Item (non-CCI) equipment, and interoperability with coalition forces which may not have CCI equipment.

In one embodiment, a computer implemented method comprises packaging, by a first computer, a data packet containing a group destination address as a payload of an encapsulated packet, wherein the group destination address comprises a multicast address or an anycast address; appending, by the first computer, an unicast destination address to the encapsulated packet; compressing and encrypting, by the first computer, the encapsulated packet to generate a compressed and encrypted encapsulated packet; transmitting, by the first computer, the compressed and encrypted encapsulated packet to the unicast destination address; receiving, by a second computer, the compressed and encrypted encapsulated packet, wherein the second computer is associated with the unicast destination address; decrypting and decompressing, by the second computer, the compressed and encrypted encapsulated packet to derive the encapsulated packet; decapsulating, by the second computer, the encapsulated packet by accessing the payload of the encapsulated packet to derive the data packet; retrieving, by the second computer, the group destination address from the data packet; and in response to the second computer determining that the group destination address is the multicast address: transmitting, by the second computer, the data packet to a plurality of computers based on the multicast address; in response to the second computer determining that the group destination address is the anycast address: transmitting, by the second computer, the data packet to one of the plurality of computers based on the anycast address.

In another embodiment, a system comprises a first set of computer instructions stored in a user device, which when executed by a first processor of the user device cause the first processor to: package a data packet containing a group destination address as a payload of an encapsulated packet, wherein the group destination address comprises a multicast address or an anycast address; append an unicast destination address to the encapsulated packet; compress and encrypt the encapsulated packet to generate a compressed and encrypted encapsulated packet; transmit the compressed and encrypted encapsulated packet to the unicast destination address; a computer associated with the unicast destination address comprising a second processor configured to: receive the compressed and encrypted encapsulated packet; decrypt and decompress the compressed and encrypted encapsulated packet to derive the encapsulated packet; decapsulate the encapsulated packet by accessing the payload of the encapsulated packet to derive the data packet; retrieve the group destination address from the data packet; and in response to the second processor determining that the group destination address is the multicast address: transmit the data packet to a plurality of computers based on the multicast address; in response to the second processor determining that the group destination address is the anycast address: transmit the data packet to one of the plurality of computers based on the anycast address.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
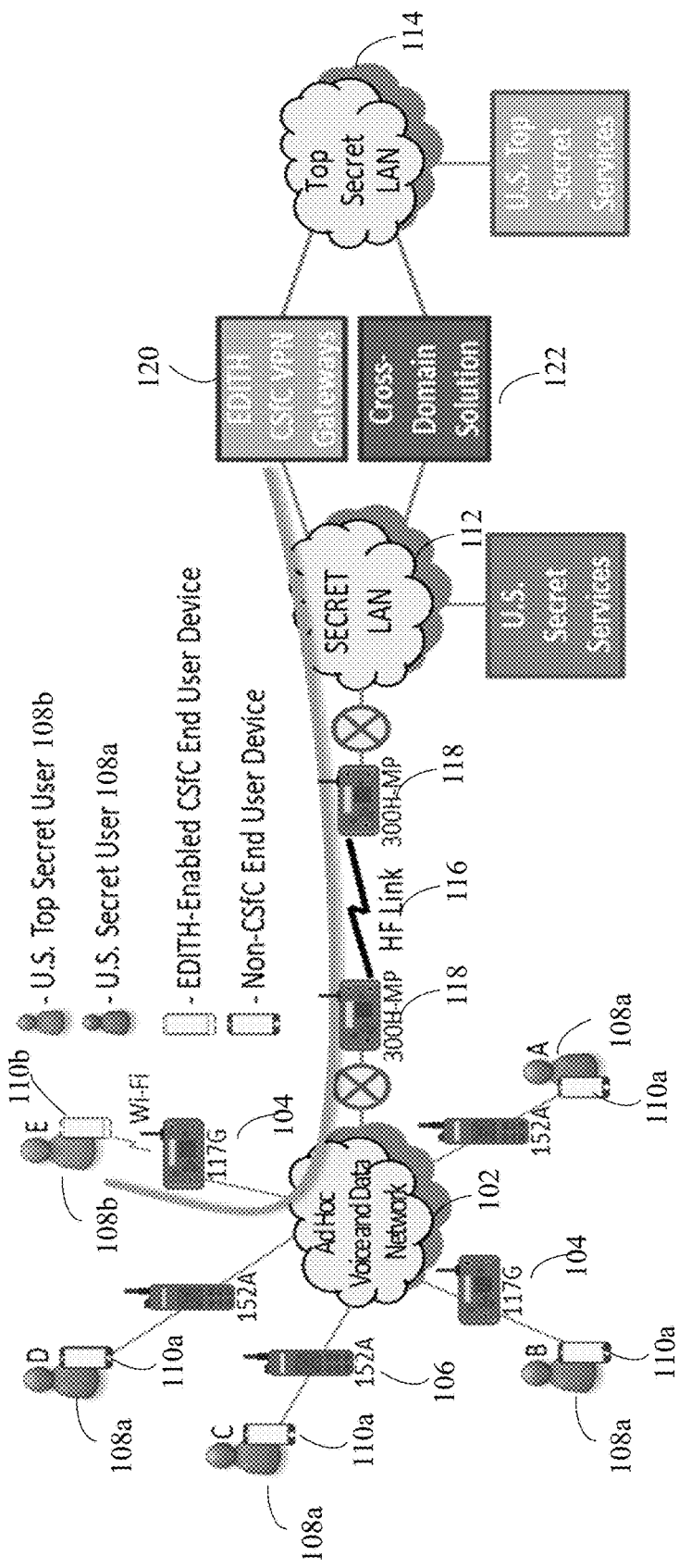
FIG. 1 illustrates components of an exemplary system for protecting data-in-transit, according to an exemplary embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

The EDITH module disclosed herein may implement Virtual Private Network (VPN) Clients or EDITH VPN Gateways on an end user device (EUD) and EDITH VPN Clients or EDITH VPN Gateways on an infrastructure. In one embodiment, the EUD may generate data packets and transmit the data packets to a secure network (e.g., Top Secret Local Area Network) over any untrusted network and/or unencrypted wireless link. The EDITH VPN Clients on the EUD may double encrypt the data packets originating from the EUD with different cryptographic keys. Specifically, the EDITH VPN Clients on the EUD may encrypt the data packet with an inner layer cryptographic key and an outer layer cryptographic key. In addition, the EDITH module on the EUD may double compress the data packets by removing header fields that are constant over the same packet flow to reduce network overhead while optionally keeping the first data packet uncompressed. Specifically, the EDITH module on the EUD may compress a data packet by removing a portion of the header of the data packet to generate an inner layer compressed data packet; encrypt the inner layer compressed data packet with an inner layer cryptographic key to generate an inner layer compressed and encrypted data packet; compress the inner layer compressed and encrypted data packet to generate an outer layer compressed data packet; and encrypt the outer layer compressed data packet with an outer layer cryptographic key to generated an outer layer compressed and encrypted data packet. Such double encrypted and double compressed data packets may traverse the untrusted networks, and reach the infrastructure interfacing or fronting the secure network. Although double compression and double encryption are introduced, single compression and single encryption should be considered within the scope of this disclosure.

The EDITH VPN Gateways or EDITH VPN Clients on the infrastructure may receive the double encrypted and double compressed data packets, and decrypt the outer layer encryption with Outer EDITH Gateway and decrypt the inner layer encryption with Inner EDITH Gateway. In addition, the EDITH module on the infrastructure may decompress the received data packets by recreating the original data packets based on the first uncompressed data packet. Specifically, the EDITH module on the infrastructure may decrypt the outer layer data packet using the outer layer cryptographic key to derive the outer layer compressed data packet; decompress the outer layer compressed data packet by adding header information derived from a previous outer layer encrypted data packet to derive the inner layer compressed and encrypted data packet; decrypt the inner layer compressed and encrypted data packet using the inner layer cryptographic key to derive the inner layer compressed data packet; and decompress the inner layer compressed data packet by adding header information derived from a previous data packet to derive the data packet. After deriving the original data packets, the EDITH module on the infrastructure may transmit the original data packets to the secure network. Although double decryption and double decompression are introduced, single decryption and single decompression should be considered within the scope of this disclosure.

In another embodiment, the EUD may generate a multicast data packet to be transmitted to multiple group members. However, the CSfC MA CP requirements do not support multicast, the multicast traffic may be dropped by the VPN components. To support multicast, the EDITH module on the EUD may encapsulate the data packet in a Generic Routing Encapsulation (GRE) packet and direct the GRE packet to a unicast destination address of an EDITH Multicast Router included in the infrastructure. The EDITH module on the EUD may compress the GRE packet by removing header fields that are constant over the same packet flow and double encrypt the GRE packet with different cryptographic keys. In some other embodiments, the EDITH module may encapsulate the data packet according to any other suitable encapsulating protocols.

The infrastructure may receive the double compressed and encrypted GRE packet. The EDITH module on the infrastructure may decrypt the GRE packet and decompress the GRE packet to recreate the GRE packet. The EDITH module on the infrastructure may decapsulate the GRE packet to derive the original multicast data packet, and distributes the original multicast data packet to the multiple group members based on the multicast destination address in the original multicast data packet. In one embodiment, that is fully MA CP compliant, the EDITH Multicast Router may send the original multicast packet, GRE encapsulated, via multiple unicast packets to each group member individually to ensure correct distribution. In another embodiment, that requires permission for deviation from two MA CP requirements (MA-CR-9 and MA-PF-9), the EDITH Multicast Router may send a single multicast packet into the Radio Network for each multicast packet received (after GRE decapsulation), using the correct multicast destination address for the group and the original sender's source address.

EDITH Design Features

T1. Protect classified information up to SECRET level as it travels from a warfighter's handheld computing device, such as a smartphone or tablet, over an untrusted or lower classification level tactical radio network T2. Operate over a variety of network technologies, i.e., agnostic to the network used T3. Provide protection for IP multicast transmissions T4. Enable use of Android and Windows on handheld devices T5. Minimize network overhead of protection technique—desired goal is under 6% packet overhead for a TCP packet with a 1000 octet payload T6. Be certifiable through the CSfC process T7. Provide a non-controlled cryptographic item (CCI) solution T8. Support end user devices (EUDs) compliant with CSfC Mobile Access Capability Package MA CP Version 1.1 requirements T9. Enable operation of existing UDP and TCP based applications without requiring modifications to the software of these applications T10. Support multiple endpoints operating at different security classification levels T11. Support QoS-based traffic control T12. Support EUDs compliant with current draft of MA CP Version 1.8

T13. Enable interoperation of CSfC-qualified EUDs with non-CSfC EUDs (such as Nett Warrior)

EDITH Encryption and Header Compression

FIG. 1 illustrates components of an exemplary system 100 for protecting data-in-transit, according to an exemplary embodiment. In FIG. 1, an ad hoc network 102 of wideband IP radios, i.e., PRC-117Gs 104 and PRC-152As 106, may provide netted voice as well as IP data services, using a waveform such as Adaptive Networking Wideband Waveform (ANW2) or Soldier Radio Waveform (SRW), to a group of forward-deployed warfighters 108a, 108b. The warfighters may be equipped with handhelds 110a, 110b, e.g., tablets or smartphones, running mission applications providing situational awareness and Command and Control (C2) capabilities. The forward deployed ad hoc network 102 may be connected to a remote tactical operations center, containing a SECRET LAN 112 and a TOP Secret (TS) LAN 114, through a long-haul HF link 116 implemented by RF-300H-MP radios 118. Assume that the throughput of the ad hoc network 102 varies from 400 Kbps to 1 Mbps while that of the HF link 116 varies from 9600 bps to 120 Kbps. Furthermore, assume that all the warfighters 108a, 108b in the ad hoc network 102 are in the same netted voice group operating at the SECRET level. However, for data applications the warfighters may operate at different classification levels; warfighters A-D 108a may operate at the SECRET level whereas warfighter E 108b, who may need to access to the TOP SECRET information in the remote LAN 114, must operate at the TS level.

EDITH-enabled VPN Client and VPN Gateway products 120 enable this multiple security level operations scenario by implementing the MA CP compliant two-layered IPsec tunnel connecting the end user device (EUD) of warfighter E 108b with the remote TS LAN 114 over the waveform-diverse SECRET IP tactical network shown in the figure.

Figure 2:
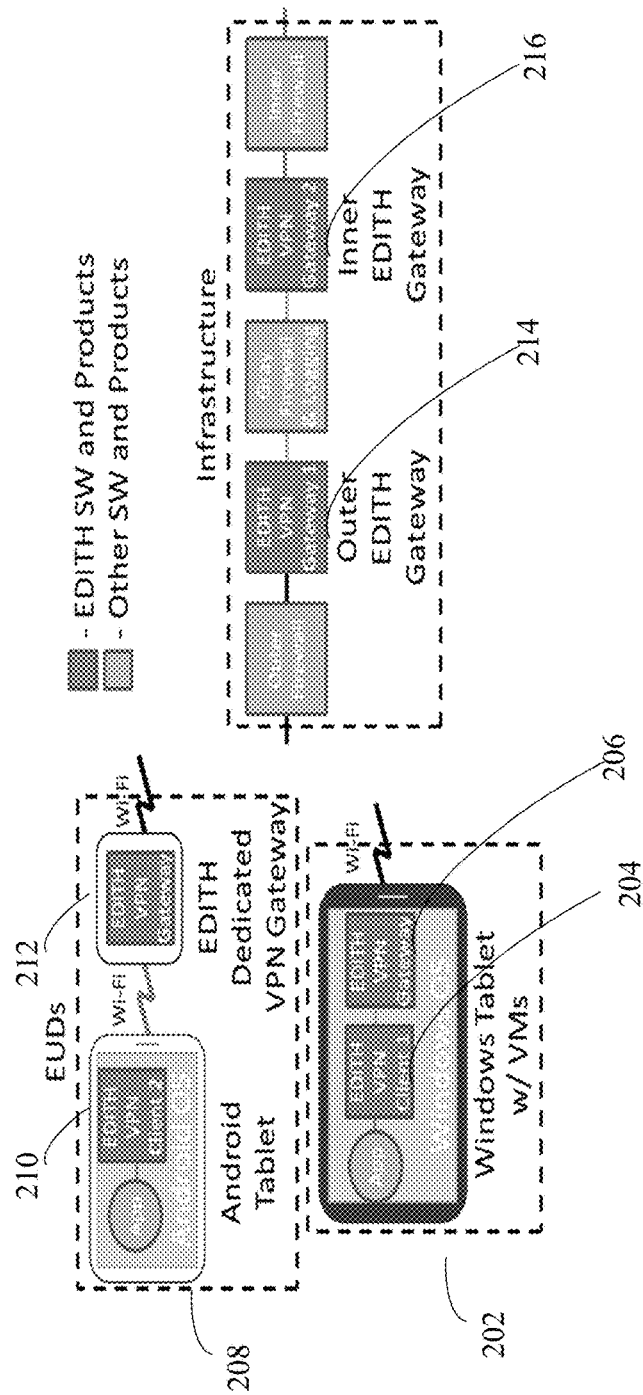
FIG. 2 illustrates EDITH CSfC MA CP-compliant EUD and Infrastructure products, according to an exemplary embodiment.

FIG. 2 illustrates EDITH CSfC MA CP-compliant EUD and Infrastructure products 200, according to an exemplary embodiment. As shown in FIG. 2, EDITH VPN Clients and EDITH VPN Gateways enable the handheld device of warfighter A to operate as an MA CP VPN EUD by providing the inner and outer IPsec encryption components for Windows and Android handhelds. For Windows EUDs 202, there may be two EDITH-Enabled VPN Clients/Gateways. As shown in the figure, the two VPN Clients/Gateways 204, 206 (VPN components) are designed to run on two separate IP stacks on distinct virtual machines running on the EUD. These virtual machines may be supported by running a Type 2 hypervisor such as Virtual Box or VMware Player on the EUD. Since Android EUDs 208 do not currently support hypervisors needed to host separate IP stacks, there may be a wireless Dedicated VPN Gateway (compliant with the draft MA CP version 1.8) 212 for providing the outer IPsec encryptor for such devices; a VPN Client software product 210 for Android may provide the inner IPsec encryption. In this case, MA CP 1.8 considers the Dedicated Outer VPN to be within the boundary of the EUD as shown in the figure.

In the EDITH approach, the double-encrypted IPsec packet stream originating from the EUD can be transmitted to the warfighter's IP radio over any unencrypted wireless link (e.g., 802.11 or Bluetooth) if the radio is equipped with a wireless data port. The latter can be realized by using products such as General Dynamics Universal Applications Product (GD's UAP) or Datasoft's Sidebridge. The inner and outer IPsec connections originating from the EUD terminate at the EDITH-based inner VPN Gateway 216 and outer VPN Gateway 214 fronting the TOP SECRET LAN, as shown in FIG. 2. One having ordinary skill in the art would appreciate that the EDITH approach may be applied to other scenarios where secure data transmission in multicast is required.

Referring to FIG. 1, Warfighter E 108b using a headset connected to the radio voice port can perform voice communication with any of the other warfighters in the group at the SECRET level. Simultaneously, using an EDITH-enabled EUD connected to the data port of the same radio, warfighter E can access TOP SECRET information from the remote LAN 114. Also, warfighter E 108b is able to exchange Command Control (C2) and Situational Awareness (SA) data at the SECRET level with others in the group. These exchanges may be mediated by a cross domain solution 122 connecting the remote TS LAN 114 to the SECRET LAN 112 as shown in FIG. 1. While the example of FIG. 1 shows US forces operating with CCI equipment, the EDITH approach may also accommodate multiple security level networking where some network participants may have non-CCI devices or operate at the Sensitive But Unclassified (SBU) level.

In contrast to the CSfC-based EDITH approach, multiple security networking using the traditional approach is either cost prohibitive or performance deficient. Traditionally, separate networks implemented by separate radios are used to isolate traffic in separate security domains. This is not only expensive but is complex to operate. The emergence of miniaturized high assurance Internet protocol encryption (HAIPE)-based Type 1 inline network encryptors (INEs) such as the L-3 Talon provide an encryption alternative to CSfC encryptors for EUDs. However, these Type 1 devices are an order of magnitude more expensive than CSfC products; furthermore, having no internal power source, the Type 1 devices must draw power from the EUD, which could unacceptably decrease EUD operating times. Lastly, the Type 1 devices may incur 94 bytes of overhead per 1000 byte Transmission Control Protocol (TCP) packet compared to 54 bytes for the EDITH approach, which is significant when one considers tactical links operating at 9600 bps under certain circumstances.

Existing VPN Client and VPN Gateway products on the CSfC Component List are unsuitable for bandwidth-constrained tactical networks such as the network of FIG. 1. To provide support for a broad range of IP-based mission applications, including UDP applications, IPsec must be employed for the inner as well as the outer layer of encryption. Transport Layer Security (TLS) EUDs which only support TCP and Real-time Transport Protocol (RTP) based applications may not meet the requirements of providing support for a broad range of IP-based mission applications; VPN EUDs providing two IPsec layers must be used. The needed double IPsec encryption of data incurs 144 bytes of overhead for a TCP packet with a 1000 byte payload when using existing VPN products. This is a significant overhead when one considers tactical links, which may operate at speeds of 9600 bps. EDITH may reduce the overheard to 54 bytes (e.g., more than a half), saving precious bandwidth on the links. Unlike EDITH-enabled VPN products, existing products do not support needed multicast and QoS capabilities.

Thus, the EDITH VPN Client and VPN Gateway products described in this patent application overcome the limitations of the state of the art to provide cost-effective and bandwidth-efficient multiple security level networking for warfighters equipped with mobile EUDS.

The EDITH Encryption and Header Compression is detailed in U.S. patent application Ser. No. 15/975,610, which is incorporated herein by reference in its entirety.

TABLE 1

Encryption and Compression Overhead Comparison

| | Initial Packet | ESP-Tunnel in Tunnel | EDITH Encrypted 1st packet | EDITH Encrypted Compressed |
|---|---|---|---|---|
| Ethernet MAC | 14 | 14 | 14 | 14 |
| IP Header | 20 | 20 | 20 | 20 |
| TCP Header/UDP | 20/8 | | | |
| ESP Header | | 8 | 8 | 4 |
| ESP Trailer | | 2 | 0 | 0 |

TABLE 1-continued

Encryption and Compression Overhead Comparison

| | Initial Packet | ESP-Tunnel in Tunnel | EDITH Encrypted 1st packet | EDITH Encrypted Compressed |
|---|---|---|---|---|
| Inner Encryption | | | | |
| IP | | 20 | 10 | |
| TCP/UDP | | 20/8 | 15/4 | 6-11/0 |
| IV | | 8 | 8 | 8 |
| ICV | | 12-16 | 8 | 8 |
| Padding | | 0-3 | 0 | |
| Outer Encryption | | | | |
| Outer IP | | 20 | | |
| Outer IPSec | | 8 | 0 | 0 |
| Outer IPSec Trailer | | 2 | 0 | 0 |
| IV | | 8 | 0 | 0 |
| ICV | | 12-16 | 8 | 8 |
| Padding | | 0-3 | | |
| Total UDP | 28 | 128-142 | 66 | 48 |
| Total TCP | 40 | 140-154 | 77 | 54-59 |

TABLE. 1 illustrates encryption and compression overhead comparison. Specifically, TABLE. 1 compares the header bytes included in double-encrypted frames using standard IPsec ESP Tunnel mode against the first and subsequent frames in a flow using EDITH encryption. The first column of numbers tallies the headers in an uncompressed TCP/UDP packet for comparison. Each line of a column accounts for a single header or encryption-related field expected to be present; empty entries indicate the header or field is not expected to be present, while 0 indicates the header or field has been compressed but can be reconstructed during decompression. Total overhead in UDP and TCP frames is summed up in the final two rows excluding the Ethernet header fields (14 bytes), which cannot be compressed or truncated and are not applicable in the radio network, which has its own MAC header.

As indicated by the first row of TABLE. 1, in all schemes any data traversing a network needs an IP header of 20 bytes. The two main forms of transport are TCP and UDP. TCP has a larger header than UDP, providing reliable transmission through acknowledgement and allowing packets received out of order to be reordered at the receiver and reassembled in the order expected. Overhead for UDP is less than TCP, as no handshaking or establishing of the connection is required.

The ESP tunnel-in-tunnel column is calculated for standard IPsec encryption with an AES-GCM encryption algorithm similar to that used by EDITH. Some AES-GCM implementations use a 12 byte Integrity Check Value (ICV); others use 16 bytes, hence two values are given in the ICV rows in the table; EDITH uses a fixed ICV of 8 bytes. Depending on the size of the packets, IPsec Tunnel Mode padding is required to align the encrypted payload to a 4 byte boundary, requiring 0 to 3 bytes of padding. EDITH does not pad the payload.

EDITH may perform AES-GCM-256 bit encryption on the data. Furthermore, the encryption may conform to the NSA's Commercial National Security Algorithm Suite.

EDITH may achieve low header overhead by not transmitting header information that can easily be recreated at the destination based on correlating the Flow ID with earlier recorded header field values. An additional four bytes may be saved by moving four bytes of the eight byte Initialization Vector (IV) from immediately before the compressed data (the IV is technically part of the encrypted payload but is not itself encrypted) into the ESP header, where the four bytes may replace the Security Parameter Index (SPI) field. On decompression, the SPI field value can be reconstructed given the Flow ID, from the SPI in the first packet in the flow, as it is constant for the life of the flow. The other four bytes of the IV may lead the encrypted payload, which is now four bytes shorter. This packing of the SPI does not cause any issues for handlers of the IPsec packet; the EDITH endpoint knows how to decompress the packet, and intermediate handlers of the packet have no reason to look past the IP header (the ESP header fields and encrypted payload being useless to intermediaries).

In addition to getting rid of extraneous and recreateable header information, EDITH encryption may use an algorithm with an 8 byte ICV, which is allowed by CSfC, and reuse the IV for both the inner and outer encryption. The Initialization Vector should never be used with the same key on data more than once. In operation, the inner and outer VPN encryptors may use different keys, and encrypt different data, allowing for reuse of the IV without any security concerns.

In addition, EDITH may compress the header by eliminating the padding and related ESP Trailer fields, which specify the pad length and the Next Protocol. The padding may be unnecessary for AES-GCM, which is a block cipher encryption algorithm that does not require padding. The Next Protocol field may be unnecessary because it is always ESP for the outer decryption stage, given that the payload is the result of the inner encryptor, and can be derived from the Flow ID for the inner decryption stage being either TCP or UDP.

The gray network has a single layer of encryption. The black network has two layers of encryption. The packets going across the gray and black networks may be encrypted IPsec conformant packets. The red network is unencrypted traffic. A packet decoder may identify the packets as IPsec packets. Because the compression repurposes rarely used IP header fields, fields of the IPsec ESP that have no meaning except to the VPN tunnel endpoint, and encrypted payload fields that are opaque, no network router or equipment through which the EDITH compressed packet flows will detect the modifications that achieve the low overhead.

EDITH compression may involve two packet classes. The first packet in a flow may be transmitted with no header compression. This is one class of packets considered in EDITH compression scheme. All subsequent packets in a flow may be in the second class of packets which may be compressed by reducing the number of fields or size of fields using EDITH compression to reduce the number of bytes transmitted or to reduce the size of data packets. Certain fields in the first packet in a new flow (see the column ATCorp Encrypted $1^{st}$ packet), are saved at the receiver during decryption in a database indexed by the Flow ID assigned by the sender to the first packet and used in all future packets in that flow to recall values for fields that have been removed to compress the header (see the column ATCorp Encrypted Compressed). This is the second class of packets, those packets in the flow following the first and may be compressed by EDITH. The first packet may establish the Flow ID, which is packed into the IP Header Identification and Fragment Offset fields (which are otherwise not used). The receiver may reconstruct the subsequent packets by referencing the Flow ID to reuse immutable values or to calculate the correct value of other fields based on calculated "delta" or expected changes from the initial packet value. The sender may encode the Flow ID in bits in the Identification and Fragment offset fields that will never be used in a properly configured network under a single authority. The three fragmentation bit flags preceding the Fragment Offset field must be preserved and cannot be used as part of the Flow ID, leaving 29 bits for encoding Flow IDs, allowing tracking 500 million simultaneous flows between two VPN endpoints.

Fields that cannot be predicted may be transmitted in full in the compressed header. Fields that are immutable may be dropped (compressed) from the compressed header. Fields that are not immutable but follow a regular progression, e.g., the sequence number field of a TCP header, may be reduced in binary-encoded size (compressed) for at least some duration of the flow.

The UDP header, which consists of two bytes of source port and two bytes of destination port, can be completely reconstructed given the Flow ID, and so is compressed to 0 bytes.

A TCP header may be compressed by dropping or re-encoding fields as described here. The Flags field is unpredictable and must be transmitted for each packet. TABLE. 2 illustrates a possible best case TCP data for compression after dropping fields and re-encoding information in the second class of packets, after a flow is established, according to an exemplary embodiment. TABLE. 3 illustrates a possible worst case TCP data compression after dropping and re-encoding information from original FlowID packet, according to an exemplary embodiment.

TABLE 2

Best case TCP data for diff information from original FlowID packet

```
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|P|U|S¹|S²|A¹|A²|W|R|    Sequence Number Change    |  Ack Number   |
+-+-+-+-+-+-+-+-+-+-+-+-+-+-+-+-+-+-+-+-+-+-+-+-+-+-+-+-+-+-+-+-+
|     Change       |  Window Change  |
+-+-+-+-+-+-+-+-+-+-+-+-+-+-+-+-+
```

TABLE 3

Worst case TCP data for diff information from original FlowID packet

```
 0 1 2 3 4 5 6 7 8 9 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+-+-+-+
|P|U|S¹|S²|A¹|A²|W|R|           Sequence Number Change             |
+-+-+-+-+-+-+-+-+-+-+-+-+-+-+-+-+-+-+-+-+-+-+-+-+-+-+-+-+-+-+-+-+
```

TABLE 3 -continued

Worst case TCP data for diff information from original FlowID packet

```
|     Seq Cont.    |           Ack Number Change          |
+-+-+-+-+-+-+-+-+-+-+-+-+-+-+-+-+-+-+-+-+-+-+-+-+-+-+-+-+-+
|     Ack Cont.    |         Window Size Change   |
+-+-+-+-+-+-+-+-+-+-+-+-+-+-+-+-+-+-+-+-+-+-+-+
```

As shown in TABLEs. 2 and 3, over time the need to account for larger differences from the values in the initial packet requires larger and larger Sequence Number Change, Ack Number Change, and Window Size Change fields. As a result, the size of the compressed TCP header varies from 6 bytes initially to as much as 11 bytes. The five byte savings gained by calculating changes is worth the effort given the short duration of many TCP connections, and the fact that the Window Change is often constant for the duration of a TCP connection.

Assume that the Urgent pointer in the TCP header is not used, so it is not transmitted in packets other than the first packet. In the event that it is necessary to make use of that field, an additional byte of data would always need to be a part of the TCP header, bumping the total header overhead for EDITH to the range of 55 to 60 bytes for TCP data.

For all encrypted packets, EDITH uses AES-GCM-256 encryption with an 8 byte ICV to minimize the header size. RFC 4106 states that when using GCM, IPSec encryption allows ICV sizes of 8, 12, or 16 bytes. Similarly, with AES-GCM encryption, there is no need for padding, except to satisfy the IPsec frame format which is aligned to four bytes. EDITH excludes padding to save one to four bytes that would otherwise be necessary (one byte for padding length, and up to three bytes of padding). Since the padding is always zero and the Flow ID value can be used to look up whether a packet is UDP or TCP, the padding, pad length, and next-header fields of the ESP trailer can be expunged.

One example embodiment of EDITH compression may reuse the IV, use algorithms that do not require padding, and use Flow IDs to truncate predictable fields at the sender and recreate headers at the receiver.

TABLE. 4 illustrates packed compressed EDITH IPsec packet, according to an exemplary embodiment. The TABLE. 4 shows what the packets will look like before going over the network. The field format comports with IPSec encrypted packets, with some information packed into the header, and the rest as part of the data.

The final contributor to overhead in MA CP is Internet Key Exchange (IKE), which is required to be used by the MA CP to dynamically key and re-key the VPN tunnels by distributing keys used to encrypt and decrypt the data traffic. Authentication may use certificates, verified by a certificate authority, but for efficiency, the following calculations assume pre-placed keys for authentication.

TABLE 4

Truncated and Packed EDITH IPsec Packet

```
 0                   1                   2
 0 1 2 3 4 5 6 7 8 9 0 1 2 3 4 5 6 7 8 9 0 1 2
+-+-+-+-+-+-+-+-+-+-+-+-+-+-+-+-+-+-+-+-+-+-+-+-+-+-+-+-+-+
| Version IHL  |Type of Service|         Total Length          |
+-+-+-+-+-+-+-+-+-+-+-+-+-+-+-+-+-+-+-+-+-+-+-+-+-+-+-+-+-+
|          FlowID              |Flags|    FlowID Continued     |
+-+-+-+-+-+-+-+-+-+-+-+-+-+-+-+-+-+-+-+-+-+-+-+-+-+-+-+-+-+
| Time to Live |  Protocol=50  |         Header Checksum       |
+-+-+-+-+-+-+-+-+-+-+-+-+-+-+-+-+-+-+-+-+-+-+-+-+-+-+-+-+-+
|                       Source Address                          |
+-+-+-+-+-+-+-+-+-+-+-+-+-+-+-+-+-+-+-+-+-+-+-+-+-+-+-+-+-+
|                     Destination Address                       |
+-+-+-+-+-+-+-+-+-+-+-+-+-+-+-+-+-+-+-+-+-+-+-+-+-+-+-+-+-+
|                        4 bytes of IV                          |
+-+-+-+-+-+-+-+-+-+-+-+-+-+-+-+-+-+-+-+-+-+-+-+-+-+-+-+-+-+
|                       Sequence Number                         |
+-+-+-+-+-+-+-+-+-+-+-+-+-+-+-+-+-+-+-+-+-+-+-+-+-+-+-+-+-+
|                        4 bytes of IV                          |
+-+-+-+-+-+-+-+-+-+-+-+-+-+-+-+-+-+-+-+-+-+-+-+-+-+-+-+-+-+
|                                                               |
+                                                               +
|                      Encrypted Data . . .                     |
+                                                               +
|                                                               |
+-+-+-+-+-+-+-+-+-+-+-+-+-+-+-+-+-+-+-+-+-+-+-+-+-+-+-+-+-+
|                             ICV                               |
+                                                               +
|                                                               |
+-+-+-+-+-+-+-+-+-+-+-+-+-+-+-+-+-+-+-+-+-+-+-+-+-+-+-+-+-+
```

Multicast Design

EDITH may encapsulate and encrypt IP multicast packets in a manner consistent with CSfC MA CP restrictions, allowing mobile applications to operate unchanged and communicate with other mobiles and infrastructure located services using multicast protocols. An EDITH multicast routing agent running in infrastructure may facilitate efficient, secure distribution of multicast packets, and a novel solution involving local multicast reflection agents was devised to avoid the need for transmitting multicast over long distance radio networks in certain use cases, e.g. for a mobile chat application used by teams or squads in-mission.

Multicast applications may be a problem in an existing CSfC MA CP compliant architecture, because of three restrictions in the NIA CP that apply to EUD and Infrastructure:

1) CSfC MA CP forbids user multicast traffic. MA CP version 1.1 requires multicast packets received by the Outer VPN Gateway on the black network be dropped. MA CP draft version 1.8 requires multicast packets received on any interface of the Outer VPN Gateway or inner encryption components be dropped (MA-PF-9).

2) Red traffic may only transit MA CP compliant paths or Authorizing Official (AO) approved solutions protecting data in transit (MA-SR-7). An MA CP compliant path requires Outer VPN tunnel connections have exactly two endpoints, one in the EUD and one in the Infrastructure, which can log and monitor traffic in the gray network.

3) Encryption key distribution must utilize Internet Key Exchange (IKE) (MA-CR-9), which prevents group keys that would allow multiple receivers to decrypt a single multicast-distributed packet.

EDITH proposes a fully MA CP compliant solution to provide support for multicast communication, where multicast data may originate at mobile devices or in infrastructure services and be directed to multiple mobile or infrastructure multicast group members. The EDITH multicast solution may be less efficient than multicast, but is significantly more efficient than replacing multicast with unicast, which may be done via application modification or by capturing multicast packets and re-transmitting as multiple unicast packets encapsulating the multicast data directed to each multicast group participant.

In one embodiment, consider a multicast packet originating at an EUD and having a multicast destination with group members at other EUDs. The full MA CP compliant EDITH solution may first encapsulate the EUD-created multicast packet in a Generic Routing Encapsulation (GRE) frame and direct the GRE packet to the unicast destination address of an EDITH Multicast Router (a rendezvous point with integrated GRE encapsulation/decapsulation). The Multicast Router is deployed in infrastructure as defined by the MA CP. The EDITH VPN components at the EUD may double encrypt the GRE packet, which may be decrypted by the EDITH VPN components at the infrastructure before being forwarded to the EDITH Multicast Router, which is a member of every multicast group on behalf of EUDs.

Figure 3:
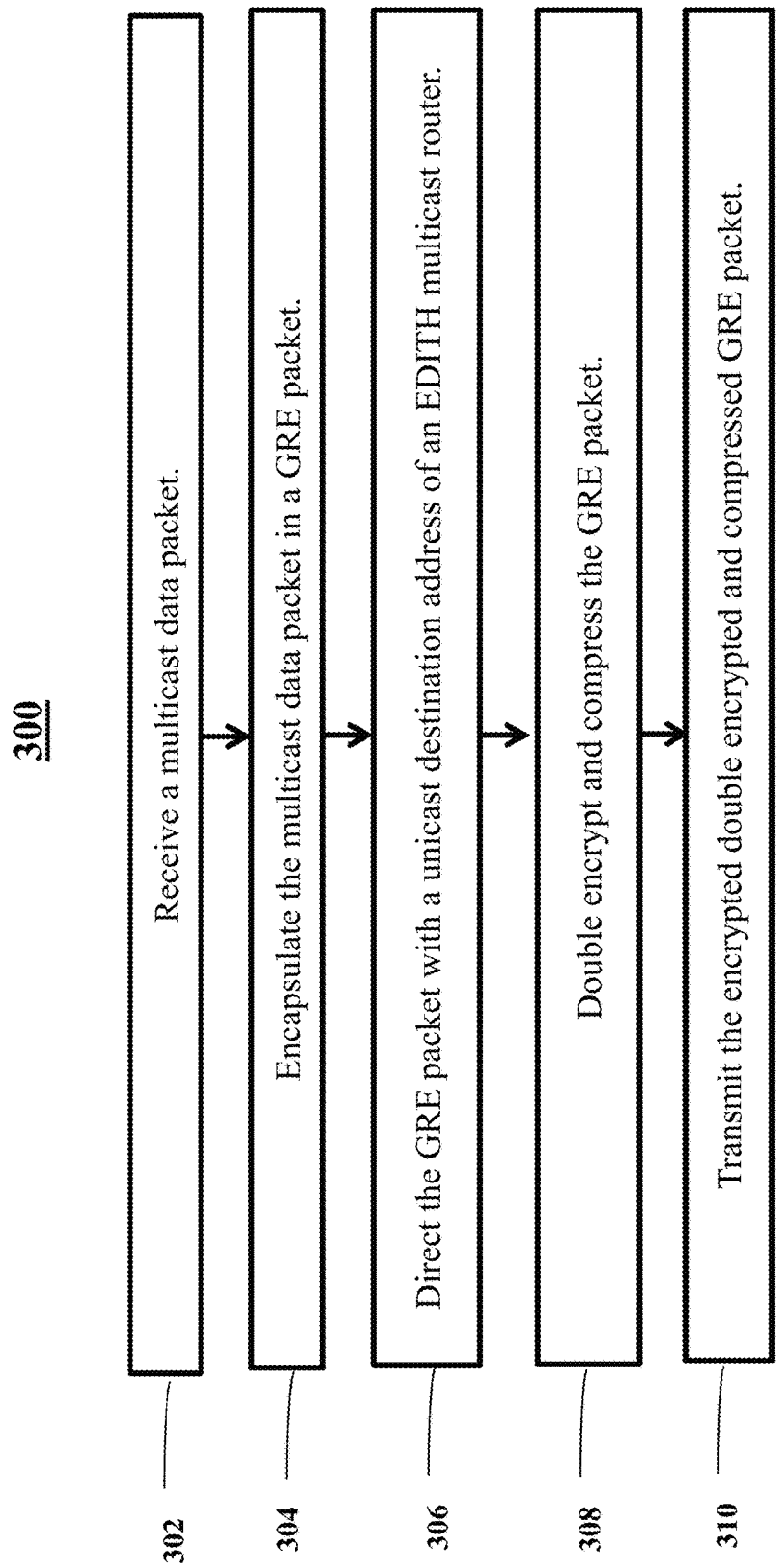
FIG. 3 illustrates a flowchart depicting operational steps for sending an EDITH multicast packet at sender, according to an exemplary embodiment.

FIG. 3 illustrates a flowchart depicting operational steps for sending an EDITH multicast packet at sender 300, according to an exemplary embodiment. Other embodiments may comprise additional or alternative steps, or may omit some steps altogether.

At step 302, the EDITH module may receive a multicast data packet generated by a user device (e.g., EUD). The EDITH module may be a software module running on the EUD. The generated data packet may be a multicast packet, that is addressed to a multiple mobile or infrastructure multicast group members. The data packet may comprise Internet protocol (IP) header and payload data. The IP header may include information about source IP address and destination IP address, and the like. Because the data packet is a multicast packet, the destination IP address may be a multicast address. In some other embodiments, the data packet may be an anycast packet, the destination address may be an anycast address. Anycast is a network addressing and routing method in which data packets from a single sender are routed to any one of several destination nodes, selected on the basis of which is the nearest, lowest cost, healthiest, with the least congested route, or some other distance measure.

At step 304, the EDITH module may encapsulate the data packet in a GRE packet. As discussed above, the data packet is a multicast packet or an anycast packet, the destination IP address of the data packet may be a group address that is corresponding to a group of potential receivers. Because CSfC MA CP forbids multicast traffic, MA CP may require multicast packets received by the Outer VPN Gateway be dropped. To prevent the multicast data packet being dropped, the EDITH module may encapsulate the multicast data packet in a GRE frame. For example, The EDITH module may package the received multicast data packet as the payload of the GRE packet and add a new header for the GRE packet. In other words, the multicast data packet including the multicast address in the IP header may be contained in the payload of the GRE packet. In the packet routing or forwarding process, the intermediate nodes may not check the payload. Thus, the GRE packet may not appear as a multicast packet.

At step 306, the EDITH module may direct the GRE packet with a unicast destination address of an EDITH Multicast Router. In operation, the EDITH module may append and/or add a new header to the GRE packet, where the destination address in the new header may be the unicast destination address of an EDITH Multicast Router. Because the GRE packet has the unicast destination address, the GRE packet may reach the EDITH Multicast Router without being dropped. The EDITH Multicast Router included in the infrastructure may be a member of every multicast group. The EDITH Multicast Router may be able to decapsulate the GRE packet and derive the original multicast data packet. The EDITH Multicast Router may distribute the multicast data packet to the multiple group members based on the multicast address in the original multicast data packet.

At step 308, the EDITH module may double encrypt and compress the GRE packet. The process of double encrypting and compressing the GRE packet is detailed in U.S. patent application Ser. No. 15/975,610, which is incorporated herein by reference in its entirety.

At step 310, the EDITH module may transmit the double encrypted and compressed GRE packet. The transmission may ensure the security over untrusted networks because of the double encryption. In addition, the transmission may incur limited overhead because of the double compression by removing the constant and/or receiver-predictable header fields. Because the GRE packet has the EDITH Multicast Router address as the destination address, the GRE packet may reach the EDITH Multicast Router in the transmission.

Figure 4:
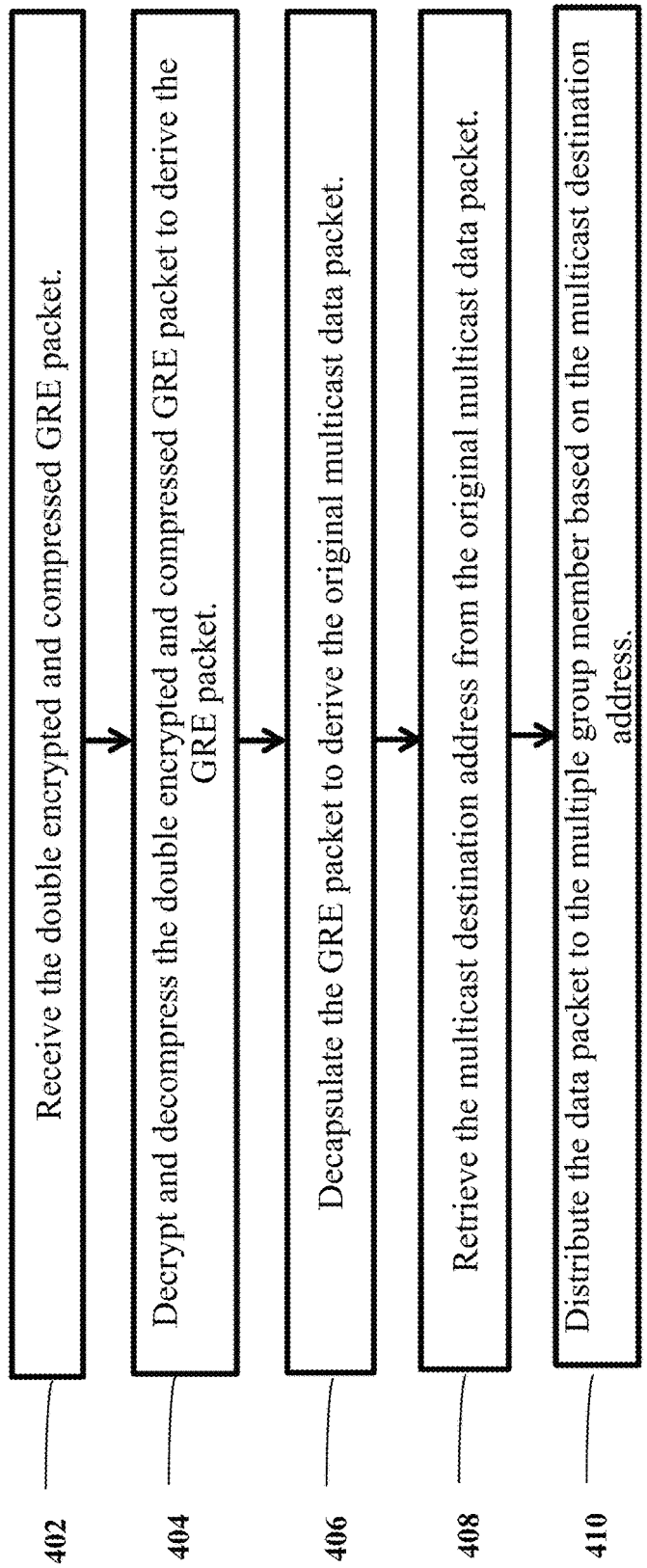
FIG. 4 illustrates a flowchart depicting operational steps for distributing an EDITH multicast packet at the infrastructure, according to an exemplary embodiment.

FIG. 4 illustrates a flowchart depicting operational steps for distributing an EDITH multicast packet at the infrastructure 400, according to an exemplary embodiment. Other embodiments may comprise additional or alternative steps, or may omit some steps altogether.

At step 402, the EDITH module at the infrastructure may receive the double encrypted and compressed GRE packet.

The Multicast Router may act as a rendezvous point for all multicast data packets, which is to say, is configured to receive any multicast data packet with a multicast destination address. In other words, the infrastructure containing the Multicast Router may receive all multicast data packets.

At step 404, the EDITH module at the infrastructure may decrypt and decompress the double encrypted and compressed GRE packet to derive the GRE packet. The process of decrypting and decompressing the double encrypted and compressed GRE packet is detailed in U.S. patent application Ser. No. 15/975,610, which is incorporated herein by reference in its entirety.

At step 406, the EDITH Multicast Router at the infrastructure may decapsulate the GRE packet to derive the original multicast data packet. The EDITH Multicast Router may access the payload of the GRE packet and derive or recover the original multicast data packet from the payload of the GRE packet.

At step 408, the EDITH Multicast Router at the infrastructure may retrieve the multicast destination address from the original multicast data packet or the anycast destination address from the original anycast data packet. The original multicast data packet may include the multicast destination address that is corresponding to destination addresses of the multiple group members. The EDITH Multicast Router may evaluate the multicast destination address to determine which EUDs are members of the multicast group. Similarly, the EDITH Multicast Router may determine a member of the anycast group, that is the nearest, lowest cost, healthiest, with the least congested route, or some other distance measure.

At step 410, the EDITH Multicast Router may distribute the data packet to the multiple group member based on the multicast destination address. After determining which EUDs are members of the multicast group, the EDITH Multicast Router may know which additional unicast or multicast addresses to send the original data packet.

In one embodiment, that is fully MA CP compliant, the EDITH Multicast Router may send the original multicast packet, GRE encapsulated, via multiple unicast packets to each group member individually to ensure correct distribution. An example of a multicast path in a fully MA CP compliant EDITH solution is shown in FIG. 5.

Figure 6:
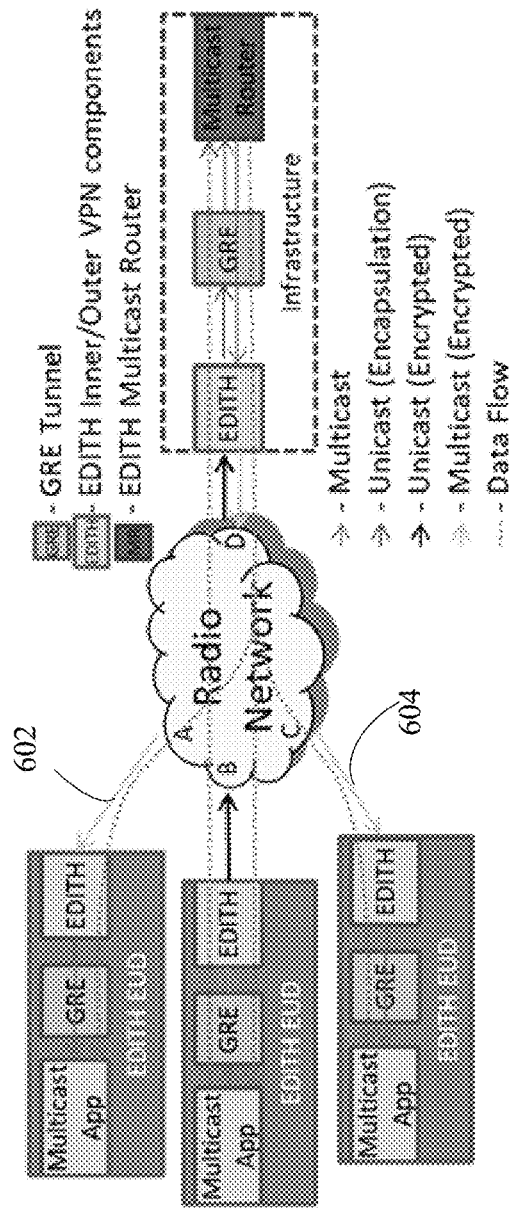
FIG. 6 illustrates an enhancement of the fully MA CP compliant solution, according to an exemplary embodiment.

In another embodiment, that requires permission for deviation from two MA CP requirements (MA-CR-9, which requires IKE be used to dynamically key VPNs in EUDs and Infrastructure, and MA-PF-9, which requires multicast traffic be dropped by the VPN components), the EDITH Multicast Router may send a single multicast packet into the Radio Network for each multicast packet received (after GRE decapsulation), using the correct multicast destination address for the group and the original sender's source address. An example of a multicast path in a fully MA CP compliant EDITH solution is shown in FIG. 6.

In the embodiment of anycast packet, the EDITH Multicast Router may transmit the original anycast packet to the computer of the determined member.

Figure 5:
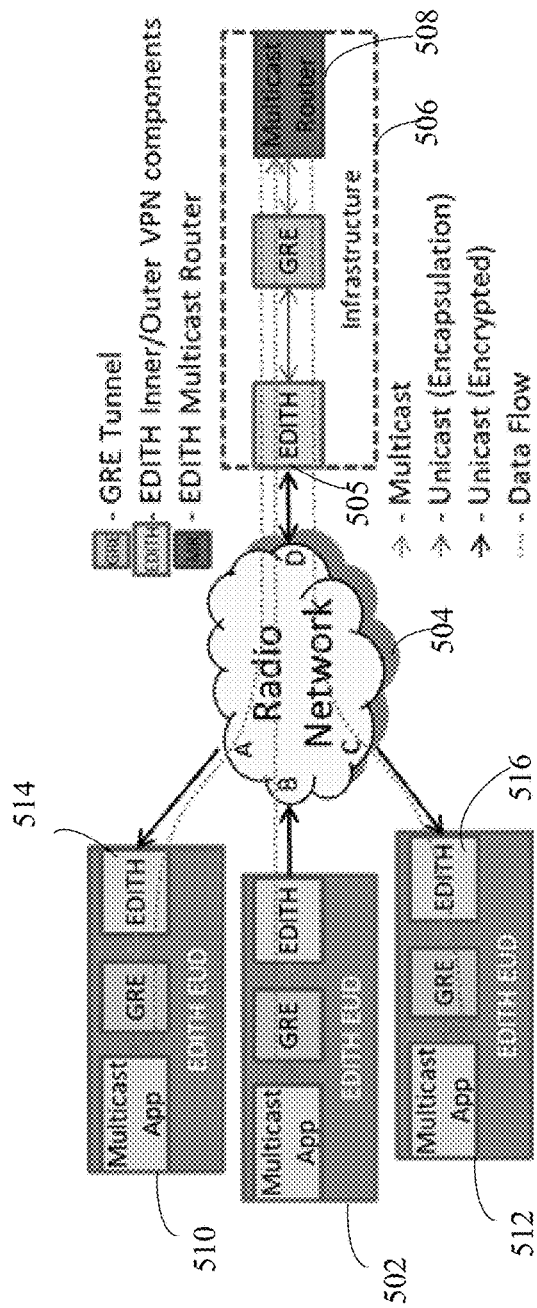
FIG. 5 illustrates a multicast path in a fully MA CP compliant EDITH solution, according to an exemplary embodiment.

FIG. 5 illustrates a multicast path in a fully MA CP compliant EDITH solution 500, according to an exemplary embodiment. The multicast path may start from a sending Multicast Application in the EUD 502 connected to the Radio Network 504 at ingress B to two other members at A and C, via the Multicast Router 508 in the Infrastructure 506.

The EDITH Multicast Router 508 in the Infrastructure 506 may remove the GRE encapsulation to recover the original multicast packet and evaluate the multicast address to determine which EUDs are members of the multicast group. The Multicast Router 508 may send the original multicast packet, GRE encapsulated, via multiple unicast packets to each group member 510, 512 individually to ensure correct distribution. These packets may be encrypted by EDITH encryption component 505 and decrypted by EDITH encryption components 514, 516. If multicast group members are located at the infrastructure location, the original multicast packet can be multicast to all group members that are local or connected via an infrastructure network such as Secret Internet Protocol Router Network (SIPRnet). When a multicast packet originates in the infrastructure network 506, the EDITH Multicast Router 508 may perform its GRE encapsulation role and unicast the packet to each EUD located multicast group member.

To determine which EUDs require the multicast packet, the Multicast Router 508 may track multicast group membership for all multicast groups. This may require an EDITH Multicast Agent (MA) (not shown) at each EUD, which listens for Internet Group Management Protocol (IGMP) join and leave messages from applications and keeps the Multicast Router apprised; the Multicast Agent is not shown on the diagram as it is not involved in the multicast data flow.

The GRE frame may include the original IP multicast source address and port to ensure the sender is not included in the list of recipients for which unicast GRE packets must be created by the Multicast Router 508 in the infrastructure 506. The 24 bytes of overhead due to GRE encapsulation (encapsulating IP header plus GRE frame) is subject to compression by EDITH during encryption. The EDITH header compression algorithm may be modified to recognize GRE encapsulation and compress the unneeded bytes. EDITH may use the encapsulated IP and UDP frames to detect flows; the outer IP and GRE frames are associated with that flow and are unchanging. As a result, only the first packet in the flow is increased by 24 bytes; in every subsequent packet during the life of the flow, the encapsulating IP and GRE fields and the encapsulated IP and UDP fields are truncated by EDITH compression to 0 bytes during encryption, and the flow reduced to a 29 bit Flow ID packed into an unused field in the encapsulating IP header, which is used during decryption to look up the information from the first packet in the flow and reconstruct the IP/GRE/TCP/UDP headers. This is a minor adjustment to the design of the unicast EDITH compression algorithm to recognize GRE and requires no additional software components.

Additional multicast efficiency can be accomplished by deploying an EDITH Tactical Gateway Appliance near a cluster of handheld users anticipated to be using multicast for mobile applications. The EDITH Tactical Gateway Appliance is a unique hardware product encompassing not only the EDITH VPN functions required by the CSfC MA CP, but also MA CP required firewalls, intrusion detection, and logging, creating a complete compact MA CP infrastructure in a single case. The Multicast Router 508 may be deployed in the single case; the box labeled "Infrastructure" in FIG. 5 may represent the Tactical Gateway Appliance. The EDITH Tactical Gateway Appliance may have a single black network connection, e.g., a connection via a radio or via Wi-Fi to geographically local EUDs, and no other interfaces, i.e., it does not forward data from Wi-Fi to a radio.

The EDITH solution in FIG. 5 may allow multicast group members on multiple EUDs to communicate with each other via a nearby Multicast Router with lower latency than if the multicast traffic needed to traverse the radio network before being reflected by a Multicast Router as unicast packets.

When EUD Wi-Fi communication is an option, this arrangement also consumes no Radio Network bandwidth. The EUDs may communicate over Wi-Fi with the Multicast Router for local multicast groups, or via the Radio Network for unicast or geographically dispersed multicast groups.

The fully MA CP compliant solution in FIG. 5 may be optimal given MA CP restrictions. The ideal multicast solution may distribute multicast packets directly from a sending EUD to other EUDs of group members, via the multicast capability of the radio network, requiring no EDITH Multicast Router. Any of the three restrictions mentioned above—MA-PF-9, MA-SR-8, and MA-CR-9—alone make this impossible.

FIG. 6 illustrates an enhancement of the fully MA CP compliant solution 600, according to an exemplary embodiment. The enhancement solution may allow the multicast capabilities of the Radio Network to be used to eliminate the unicast fan-out of the Multicast Router. The enhancement solution may allow only multicast packets from the Multicast Router, which is near the EDITH VPN components preceding the rest of the Infrastructure network. The enhancement may also propose that IGMP bypass be allowed by the EDITH VPN components, so group joins and leaves can be exposed to the Radio Network. An alternative, a black-side software component, the EDITH Multicast Routing Agent, may allow synchronizing group joins/leaves if IGMP bypass is not approved.

As in the fully compliant design in FIG. 5, the multicast packet is GRE-encapsulated at the transmitting EUD before being encrypted and compressed by the EDITH Inner and Outer VPNs. The enhanced Multicast Router, in contrast to FIG. 5, may send a single multicast packet into the Radio Network for each multicast packet received (after GRE decapsulation), using the correct multicast destination address for the group 602, 604 and the original sender's source address. The multicast packet may also be forwarded to group members in the Infrastructure. After encryption, the multicast packet may be transmitted in the Radio Network (which may encompass multiple smaller radio networks), and passed by radios connected to EUDs with group members, where the packet may be decrypted to form the original multicast packet. The design may retain the EUD located Multicast Agent to monitor IGMP messages and forward group join/leave actions to the distant Multicast Router.

Figure 7:
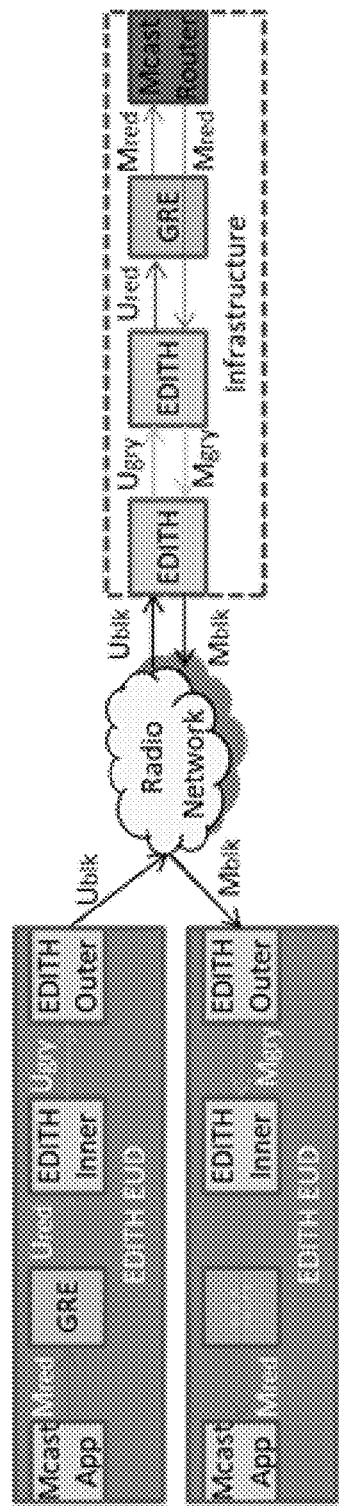
FIG. 7 illustrates various multicast to unicast translations as the packet traverses from sending EUD to receiving EUD, according to an exemplary embodiment.

FIG. 7 illustrates various multicast to unicast translations as the packet traverses from sending EUD to receiving EUD 700, according to an exemplary embodiment. The red-side multicast address $M_{red}$ may be used in the gray network and the black Radio Network (as in current HAIPE implementations) or an algorithmic mapping may be established from each red-side multicast address to black-side multicast address.

In FIG. 7. the EUD-generated red-side multicast packet directed to $M_{red}$ may be GRE encapsulated directed to Urea, the address of the Infrastructure-located EDITH Multicast Router, as in the fully compliant EDITH solution. The packet may be encrypted and tunneled through the Radio Network to reach the Multicast Router (encompassing GRE decapsulation and multicast rendezvous point functions), which may result in multicast forwarding to a directly connected red network like SIPRnet, but generally is meant to send the data back to all EUD group members, via the same multicast address, but not GRE encapsulated. After EDITH encryption, the multicast packet may be directed to $M_{blk}$ to take advantage of multicast in the radio network. At the receiving EUD(s), the receiving EUD(s) may decrypt the multicast packet and directly pass to the Multicast Apps.

When a multicast packet originates at an EUD, the radio network communication overhead is equal to the encrypted packet size, due to the need to pass the packet to the infrastructure for re-distribution to all receivers. If multicast traffic originates in the Infrastructure, only the right-to-left flow is relevant, and the only added overhead is encryption, which is very low for EDITH.

The enhanced solution may have two alternatives to keying, given its inability to use IKE. It may use pre-placed keys, in which shared keys for multicast addresses may be distributed to EUD and Infrastructure at deployment or alternatively at regular intervals using permissible secure communication, such as the Secure Shell (SSH) protocol, so that other MA CP requirements on key lifespan are adhered to. A standards-based approach to securely distributing common keys to group members would employ dynamic keying/re-keying using the protocol proposed in RFC 6407, "The Group Domain of Interpretation," which is offered by Cisco and Juniper in some routers. RFC 4535, "GSAKMP: Group Secure Association Key Management Protocol," proposes an alternative protocol. These are examples and are not exhaustive. Both approaches build on the key distribution of ISAKMP used in IPsec to distribute security association keys supporting unicast.

TABLE. 5 illustrates comparison of the number of packets generated for each multicast packet sent, according to an exemplary embodiment. Assume N+1 group members are attached to the Radio Network (that is, N multicast group receivers plus one sender), not including the Multicast Router. The table calculates total bytes sent assuming a 1000 byte payload and 10 multicast group receivers. An overhead of 24 header bytes is assumed when EDITH compression is not used, reflecting the IP and UDP header. An overhead of 48 header bytes is assumed when EDITH encryption and compression is used. Most rows assume an EUD-initiated multicast packet, and a short explanation is included in each column explaining how the total bytes sent is calculated. One row provides the total bytes assuming an Infrastructure-initiated (IF) multicast packet.

In conclusion, the use of a tactical Infrastructure solution, as countenanced by the MA CP, provides the largest savings by eliminating the use of radios for group communication in situations where senders and receivers are in Wi-Fi range and EUDs can be configured to use the tactical Infrastructure for multicast. The CSfC requirement that all EUD VPNs terminate at Infrastructure VPNs introduces overhead that cannot be overcome without deviations, but the EDITH multicast solutions represent a significant savings over unicast, and with deviations for multicast addresses and GDOI analogous key distribution can reduce the overhead to nearly the ideal for true multicast.

TABLE 5

EDITH Multicast can Improve on Naïve Unicast Implementations

|  | Non-CSfC Multicast | Non-CSfC Unicast | CSfC Unicast w/ EDITH compress | CSfC Compliant EDITH multicast | CSfC Compliant multicast w/ local MR | EDITH multicast w/ CSfC Deviation |
|---|---|---|---|---|---|---|
| Total Packets | 1 | N | 2N | 1 + N | 1 + N but 0 on radio | 1 + 1 |
| Total Bytes | 1024 | 1024*N | 2N*1048 | (1 + N)*1048 | 0 | 2*1048 |
| Total bytes for 10 recvs | 1,024 | 10,240 | 20,960 | 11,528 | 0 | 2,096 |
| Total bytes IF initiated | 1,024 | 10,240 | 10,480 | 10,480 | N/A | 1,048 |
| Notes | 1 packet is multicast to all group members | 1 packet is unicast to each group member | Each packet is routed through the MR | Each packet is sent unicast to MR then unicast to each receiver | Wi-Fi accessed MR avoids radio network traffic | Packet is sent unicast to MR then anycast to all receivers at once |

QoS Support

A constrained bandwidth environment, such as a tactical radio network, benefits from prioritizing traffic so critical data is delivered in a timely manner and less critical data is delayed or dropped when necessary. EDITH VPN components would support quality of service (QoS) management by supporting Differentiated Services Code Point (DSCP) bypass, preserving DSCP bits in the original plaintext IP packet by copying the relevant IP header field into the encapsulating inner and outer IPsec headers. This abstractly identifies the type of traffic in the encrypted payload so routing priority decisions in the Radio Network can account for different traffic needs (e.g., low latency or high priority) without decrypting the traffic. Such DSCP bypass is currently supported on all NSA-accredited inline network encryptors (INEs) based on the HAIPE standard. Furthermore, DSCP bypass is part of the IPsec standard. Hence, no deviation from MA CP requirements will be required to support this feature.

Figure 8:
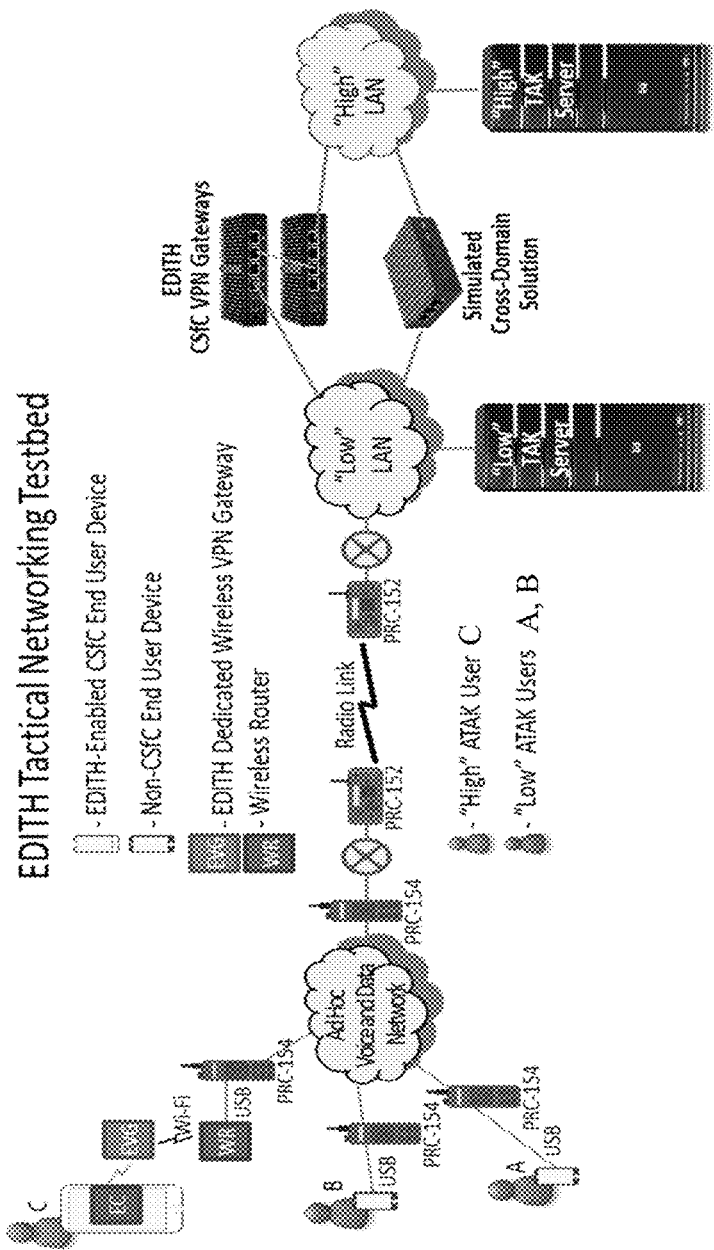
FIG. 8 illustrates a laboratory testbed representative of a tactical environment, according to an exemplary embodiment.

FIG. 8 illustrates a laboratory testbed representative of a tactical environment 800, according to an exemplary embodiment. The testbed may use real tactical radios (i.e. PRC-152a and PRC-154). Using Android Tactical Assault Kit (ATAK) as the exemplar mission application, the testbed may demonstrate CSfC MA CP compliant and bandwidth-efficient EDITH operations for unicast as well as multicast applications supported by ATAK, e.g., SA and chat applications.

Figure 9:
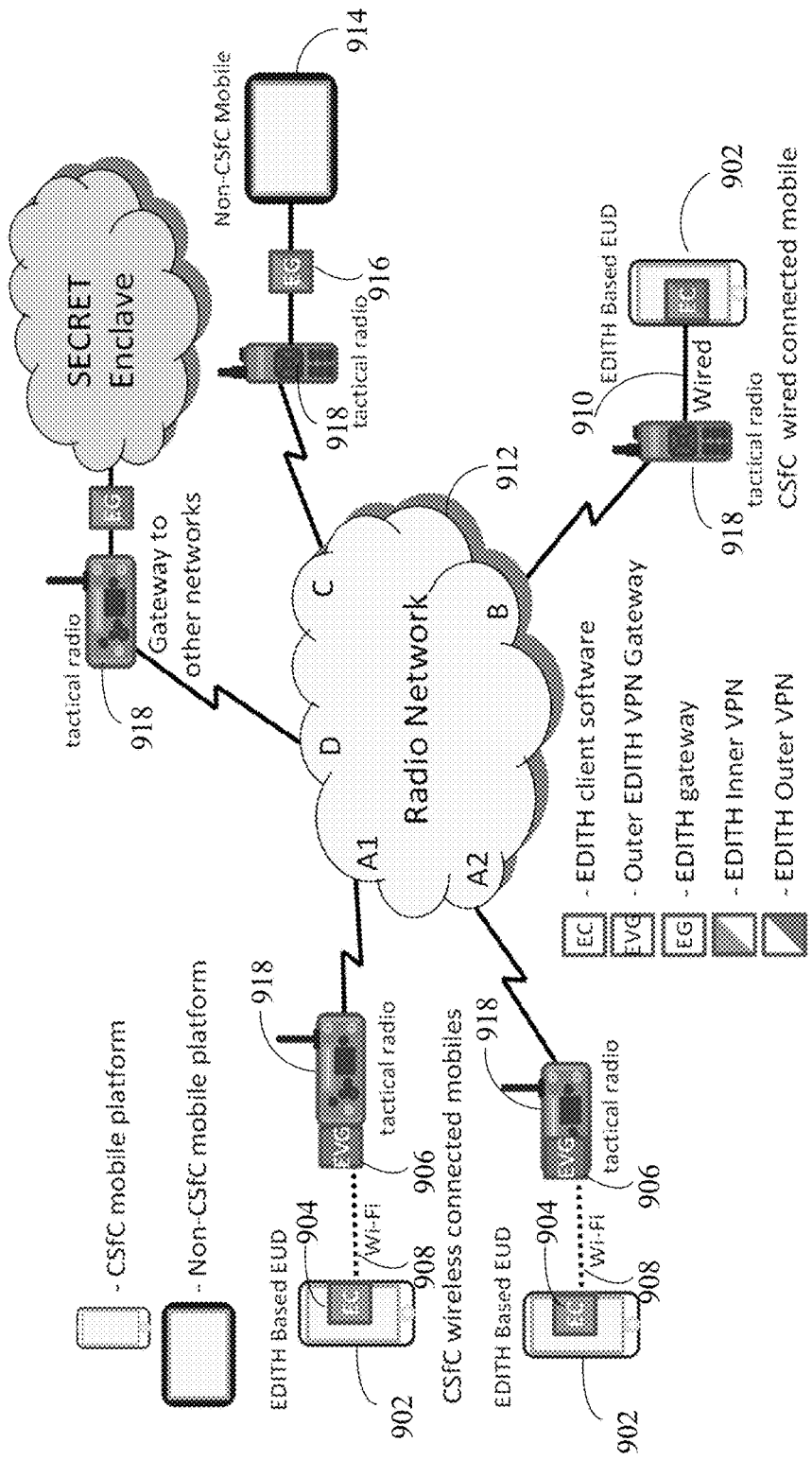
FIG. 9 illustrates a versatile architectural framework for implementing EDITH-enabled mission systems satisfying all requirements, according to an exemplary embodiment.

FIG. 9 illustrates a versatile architectural framework for implementing EDITH-enabled mission systems 900, according to an exemplary embodiment. FIG. 9 depicts a notional tactical network scenario exemplifying this architecture, and illustrates possible EDITH product embodiments in addition to those illustrated in FIG. 1 to meet the needs of different mission participants. All deployment options are interoperable, allowing, for example, a Marine with a non-CSfC Nett Warrior style handheld to securely communicate with a NATO coalition soldier having an unsecure radio and CSfC mobile platform. FIG. 9 depicts EDITH deployed in three End User Devices (EUDs) 902 as either a software component 904 within a mobile platform or as a standalone product, an EDITH "Dedicated Outer VPN Gateway," 906 which can be connected to a mobile platform via wireless 908 or wired media 910 and can then perform the necessary encryption and compression using EDITH techniques to ensure efficient, secure communication over a radio network 912 (or other network if desired) using non-crypto radios. FIG. 9 also depicts EDITH VPN gateway software products deployed in both normal infrastructure and as a compact EDITH "Tactical Gateway Appliance" 916 connected to a non-CSfC mobile platform 914.

In FIG. 9, all data is doubly encrypted as it leaves a handheld. The encrypted packet may be further encrypted by tactical radios 918 that communicate with other tactical radios, or it may be transmitted without further encryption by unsecure radios, the data already having been sufficiently encrypted according to the MA CP specifications to protect data up to TOP SECRET classification. When encrypted by EDITH on the handheld, data is protected regardless of the types of radios that are employed within the radio network, and access to data is protected by the infrastructure, through which all EUD communication must pass, which will contain it in an enclave accessible only by handhelds in the same encryption group and by extension at the same security level. CSfC-compliant encryption allows participants with different roles or security levels to share a radio network while being effectively limited to communicating within their own security level.

The following paragraphs describe the concept of operation of this system architecture.

The notional tactical network of FIG. 9 consists of a collection of IP-enabled tactical radios A1, A2, B, C, and D interconnected to one another by a bandwidth-constrained radio network 912. The tactical radios 918 may have negotiated a secure radio network using the crypto functionality built into them natively, or the radio network may be unsecure if negotiated by a group of radios that do not have crypto functionality or for which the crypto functionality is disabled or is enabled but not approved for the security level of the data to be exchanged in the scenario (e.g., they are non-CCI devices needing to communicate SECRET level communication).

The radios in the figure may be viewed as being analogous to existing manpack and handheld radios such as AN/PRC-117G, AN/PRC-152A, AN/PRC-154. When radio crypto functionality is enabled, EDITH encryption provides an additional guarantee of end-to-end data protection, providing the ability to isolate communication on multiple "virtual" communication networks by selectively assigning unique encryption keys to EDITH VPN Clients and EDITH VPN Gateways limiting communication to the subset of EUDs with keys in the same security level. By enabling end-to-end encryption, the CSfC MA CP compliant EDITH architecture guarantees data is always doubly encrypted in transit between mobile devices and infrastructure-located services protected by encryption keys known only at the endpoints and so can be forwarded without concern to the encryption or security level of the intermediate networks. Notionally, all radios in FIG. 9 are consistently configured, so that either all have crypto functionality enabled, or none use crypto functionality. This has no impact on EDITH operation.

In the scenario of FIG. 9, the classified data traffic traversing the radio network is protected by EDITH-based encryption before the data packets are transmitted over the radios. The software implementing the innovative EDITH encryption and header compression algorithm can be embedded within the mission system in various ways depicted as EC 904, EVG 906, and EG 916 boxes between radios and mobiles (EDITH Client, EDITH Dedicated Outer VPN Gateway, EDITH Tactical Gateway Appliance) or EG 916 box between radio and infrastructure network enclave (EDITH Gateways). The following paragraphs exemplify this by describing how this is accomplished for each of the six radios labeled A1, A2, B, C, and D in the figure. Furthermore, these paragraphs exemplify how this system architecture accommodates different options for connecting CSfC and non-CSfC EUDs to tactical radios and how all EUDs can interoperate securely over the radio network.

In FIG. 9, radio A1 might be a manpack device, analogous to a PRC-117G. The EDITH Client (EC) deployed on the mobile device performs only the inner VPN Client role, imposing the first layer of EDITH encryption and header compression. An EDITH Dedicated Outer VPN Gateway (EVG) provides the second layer of encryption. The Wi-Fi layer provides a temporary second layer of encryption in compliance with CSfC MA CP requirements during transmission of the packet to the EDITH Appliance. Bluetooth and NFC are not acceptable to link the mobile device in this use-case. This embodiment has the advantage that the EUD can be selected from a wider variety of CSfC compliant mobile platforms, and that it provides Wi-Fi connectivity to the radio without requiring a single-purpose device. Because the EC software module in this case imposes only the first of two EDITH encryption layers on the EUD, the EUD does not need to support virtual machines or other advanced IP stack domain separation techniques and so can be a completely COTS solution that is constrained only by the ability to run the EDITH Client software.

Radio A2 might be a manpack radio, for example a follow-up to the PRC-117G with its CCI crypto function removed. Instead, on a separate processor embedded in the radio, EDITH software would provide the Outer VPN functionality. The EUD with the first layer Inner VPN functionality would communicate via wired or Wi-Fi with the radio. The radio would be VPN Gateway equipment in the CSfC Components List. CSfC Components List inclusion would be the responsibility of the radio manufacturer. The difference between the A1 and A2 embodiments is that A1 is connected externally, similar to a Datasoft Wireless Sidebridge or GD UAP, while A2 is embedded in the radio as is a Wi-Fi access point.

Radio B is directly connected to an EUD running the two-layer EDITH Client software. The CSfC MA CP version 1.8 requirements suggest that in the future, CSfC EUDs will need to use USB for charging purposes only, not communication, and so to be compliant with the next MA CP requirements, the wired connection is expected to be Ethernet, but for CSfC MA CP 1.1 compliance, a USB connection is acceptable. In this embodiment, EDITH Inner and Outer Client VPN software running on the EUD double encrypts the IP traffic originating from it and then sends it over the USB or other wired interface to the radio.

Radio C is connected to an EDITH Tactical Gateway Appliance and then to a non-CSfC mobile. A likely candidate for the mobile is a Nett Warrior or similar military handheld. This embodiment allows a non-CSfC mobile device that cannot be used in a CSfC EUD configuration to nonetheless communicate on the Radio Network with the efficiency and interoperability offered by EDITH. Because the handheld is not used as a CSfC EUD, the wired connection may be USB in some cases. This embodiment is configured to conform to the MA CP requirements for Infrastructure in tactical environments, employing separate hardware for the Outer VPN Gateway and Inner VPN Gateway, but excluding normal Infrastructure logging and traffic monitoring requirements and could be deployed in a single hardware enclosure. This CSfC-compliant mini-Infrastructure can be deployed in a geographically localized cluster with other EDITH equipped CSfC EUDs to provide access to shared data or services in the field via Wi-Fi or short-range radio avoiding the Radio Network. An example use of this is presented in the next section, discussing EDITH support for multicast.

Radio D in FIG. 9 depicts a PRC-117G connected to EDITH Gateway products, which for compliance with the CSfC MA CP architecture would require the inner and outer encryption/decryption software to be deployed on separate hardware with firewalls and network management configured according to the MA CP guidance. The EDITH Outer Gateway receives communication from the radio network, decrypts it, and forwards it to the Inner Gateway, which decrypts it and forwards the resulting plain text packets to a secure infrastructure Ethernet network, for example connecting data servers or connecting to SIPRnet via other gateways. It similarly double encrypts packets forwarded from the infrastructure to the radio network.

While FIG. 9 illustrates several alternative product embodiments and use case scenarios for EDITH, it is by no means exhaustive. Other alternatives also exist and may be considered in the future if needed.

The EDITH VPN Client and Gateway solutions do not need to be paired in a one to one relationship. An Outer VPN Gateway, whether at the EUD or Infrastructure, can form IPsec Security Associations with any number of different Outer VPN Gateways. Each security association would have a different set of data encryption keys. Similarly, an Outer VPN Gateway can be associated with multiple Inner VPN Gateways. This might be useful to protect different data exchange relationships even when at the same security classification level. Each EDITH Client is administratively limited to a single security classification. Approaches to encompassing multiple clients at different security levels in a single mobile is an active area of research.

Figure 10:
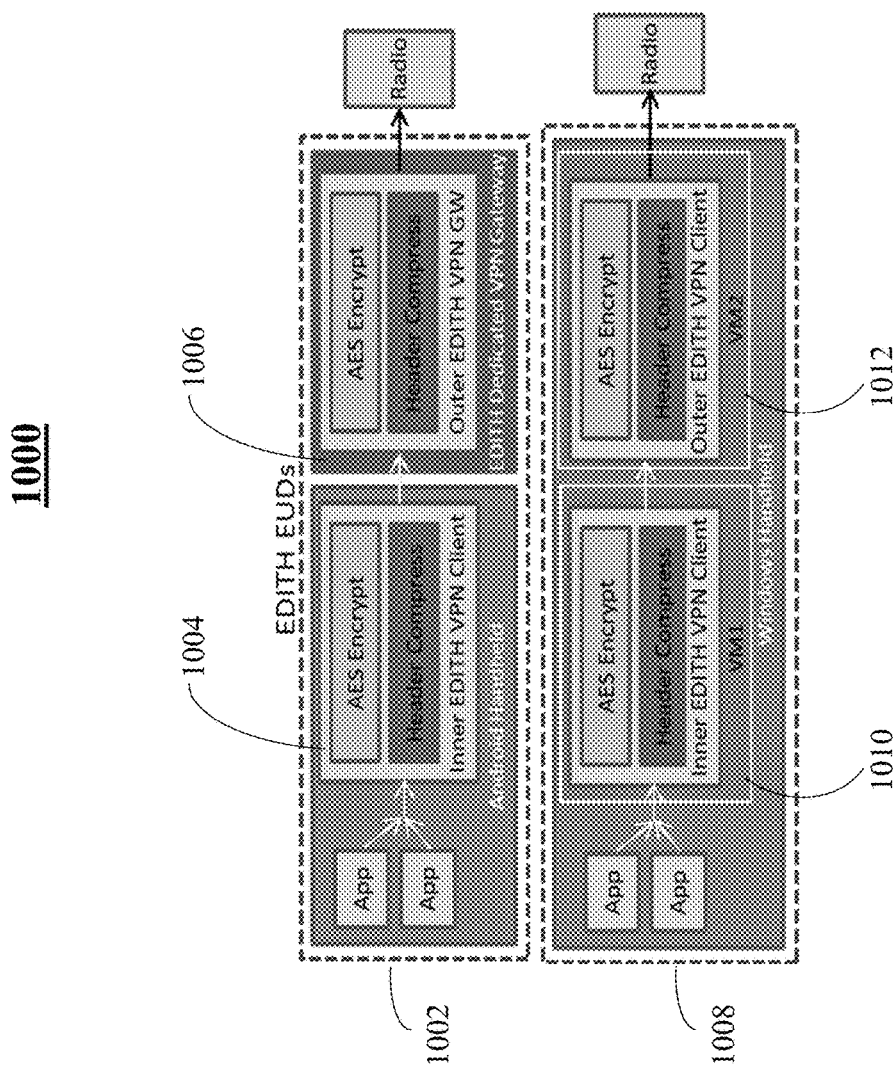
FIG. 10 illustrates EDITH VPN client and Gateway software deployed on commercial off-the-shelf (COTS) hardware, according to an exemplary embodiment.

FIG. 10 illustrates EDITH VPN client and Gateway software deployed on commercial off-the-shelf (COTS) hardware 1000, according to an exemplary embodiment. FIG. 10 shows in more detail the EDITH software components deployed within an Android 1002 and Windows 1008 based EUD. EDITH is a software solution that, to satisfy CSfC MA CP requirements, must perform two layers of encryption in isolated domains using different encryption keys. In the Android-based EUD 1002, the first layer of encryption is performed by an EDITH VPN Client 1004 running in the Android operating system, and the second layer is performed in a second hardware device, an EDITH Dedicated VPN Gateway 1006, connected via a wired or encrypted connection to the EUD and a second wired or Wi-Fi connection to the radio. In the Windows-based EUD 1008, two Virtual Machines 1010, 1012 isolate VPN Client implementations providing the inner and outer encryption in separate stacks as required by CSfC. The virtual machines run in a Windows-hosted Type-2 hypervisor. No data passes from the user operating system to the radio-connected interface without passing through the two EDITH components.

Figure 11:
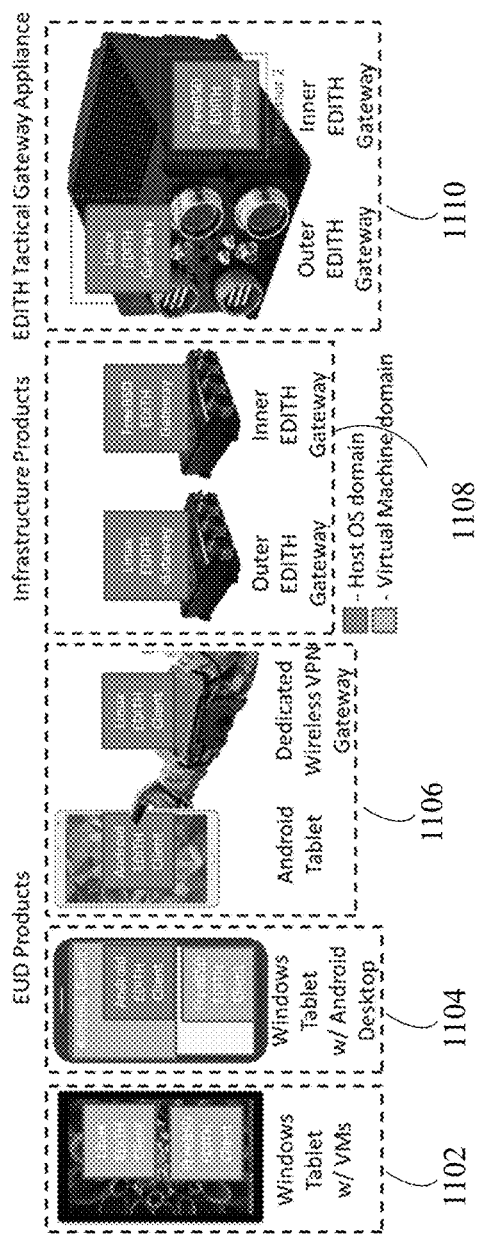
FIG. 11 illustrates EDITH Client software products in 3rd party hardware and EDITH Gateway hardware products, as appropriate to the CSfC Components List to deliver MA CP compliant solutions, according to an exemplary embodiment.

FIG. 11 illustrates EDITH Client software products in 3rd party hardware and EDITH Gateway hardware products, as appropriate to the CSfC Components List to deliver MA CP compliant solutions 1100, according to an exemplary embodiment. The first EUD 1102 is a Windows tablet in which a Linux-based virtual machine (VM) and FreeBSD-based VM are running to deliver two layers of EDITH encryption and header compression on separate IP stacks, demonstrating implementation diversity required for CSfC VPN Client solutions. The second EUD 1104 is a Windows tablet being used to run Android software in a VM, with the EDITH inner VPN client running natively in the VM Android, and the EDITH outer VPN client running in a separate VM. The third EUD 1106 is an Android tablet running the EDITH inner VPN natively and communicating via Wi-Fi with an EDITH Dedicated Wireless VPN Gateway, which provides the Outer VPN functionality. A typical MA CP compliant infrastructure architecture 1108 will include at least two PCs running EDITH Gateway software, which in the figure are Linux-based and FreeBSD-based to address the requirement for implementation diversity. Additional MA CP infrastructure-required functions are not depicted and are not provided by EDITH. The EDITH Tactical Gateway Appliance 1110 is a specialized compact, battery-powered hardware platform encompassing two separate processors and two unique EDITH Gateway software implementations. This specifically addresses the tactical infrastructure architecture identified in the MA CP to support infrastructure in a Tactical Environment in contrast to Strategic or Operational Environments. Recognizing the different needs for equipment and data protection in tactical environments, the MA CP includes Appendix E, Tactical Solutions Implementation, containing guidance and requirements for tactical solutions.

The CSfC MA CP related products in FIG. 11 that could arise from EDITH development are Linux EDITH Client, Android EDITH Client, FreeBSD EDITH Client, Linux-based EDITH Gateway, FreeBSD-based EDITH Gateway, EDITH Dedicated Wireless Outer VPN Gateway, EDITH Tactical Gateway Appliance.

The original EDITH proposed design, after further refinement, provides a solution that can be used to meet the specified requirements and subsequently discussed use cases, providing CSfC MA CP compliant encryption with less than 6% overhead for the specified test case and allowing the continued use of multicast, UDP, and TCP mobile applications without modification.

Results

A testbed is constructed to compare the overhead of two layers of CSfC IPsec-based encryption with the overhead of an EDITH prototype. The prototype, which consists of a single UDP flow between two fixed IP addresses, does not require flow tracking, and so the compression scheme was simplified to be slightly less efficient than possible in the final design. The result was 56 bytes (5.6% overhead for 1000 bytes of user data) compared to 132 bytes (13.2% for 1000 bytes of user data) overhead for two-layer IPsec ESP Tunnel.

The purpose of the prototype is to implement EDITH capabilities that demonstrate the feasibility of EDITH. The prototype implements a subset of the full capabilities, specifically, those that provide a basis for testing ideas during development.

The primary capability demonstrated in the prototype is the header compression. Additionally, the prototype proved the ability to encrypt packets using AES-CGM-256 and the selected IV and ICV field lengths employing common, robust libraries.

Figure 12:
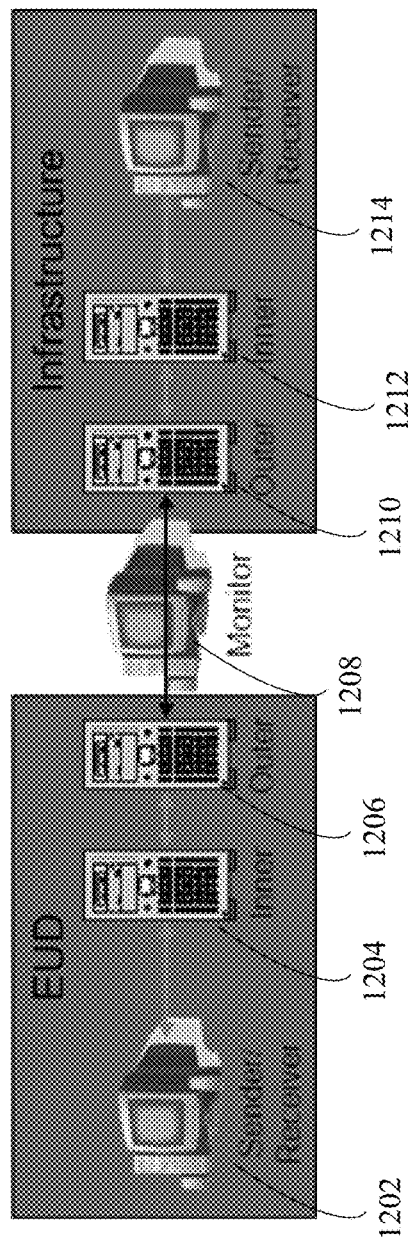
FIG. 12 illustrates a testbed, according to an exemplary embodiment.

FIG. 12 illustrates a testbed 1200, according to an exemplary embodiment. The testbed has seven nodes. Two nodes are UDP traffic senders and receivers 1202, 1214. The EDITH Inner VPN 1204, 1212 and EDITH Outer VPN components 1206, 1210 were deployed on separate computers for testing; in a product, these could be deployed in separate virtual machines on a single computer, or embedded in the Sender/Receiver computers. A middle node 1208 was added to provide traffic counting and packet capture as needed. The red network is unencrypted traffic. The gray network has a single layer of encryption. The black network has two layers of encryption and is the equivalent of the radio network in earlier diagrams.

The prototype, using UDP packets with data length of 1000 bytes, was able to demonstrate doubly encrypted compression with an overhead of 5.6%. The method of compression could easily be enhanced to improve to 4.8% for UDP. The prototype did not use Flow IDs packed into the IP header to correlate packets, necessitating the inclusion of the four bytes of the UDP header, and the prototype did not split the IV between the ESP header and the encrypted payload, accounting for another four bytes. Instead, the ESP SPI and sequence number fields were maintained by the EDITH prototype. With changes, the prototype would have achieved the 4.8% overhead calculated for the EDITH encryption and compression design.

The monitor station is also a Linux based router, and packets passed through Cisco and FreeBSD switches in the testbed, establishing that the EDITH header compression techniques did not prevent proper handling of the compressed packets as IPsec packets. Wireshark was used to capture packets during testing and identified all packets as IPsec, as did the tcpdump utility of Linux.

The format of the packet contents is the following:

Packet Sent from Sender to Inner VPN for First Layer Compression/Encryption
IP/UDP header=28 bytes
Data=1000 bytes
TOTAL=1028 bytes Packet Sent from Inner VPN to Outer VPN for Second Layer Encryption/Compression
IP Header=20 bytes
IPsec ESP Header (SPI/Sequence Number)=8 bytes
Initialization Vector=8 bytes
UDP Src/Dst Ports=4 bytes (0 in final product)
Data=1000 bytes
IPsec ESP Trailer=0 (no padding, no next header)
ICV Authentication=8 bytes
TOTAL=1048 bytes Packet Sent from Outer VPN to Outer VPN1056)
IP Header=20 bytes (Inner Header has been discarded)
IPSec header (SPI/Sequence Number)=8 bytes (reused from Inner)
Initialization Vector=8 bytes (reused from Inner)

Data+UDP Port info=1004 bytes
ICV Authentication from Inner=8 bytes
ICV Authentication=8 bytes
TOTAL=1056 bytes The prototype used standard Linux AES-GCM-256 encryption algorithms with a 256 bit key, 8 byte IV and 8 byte ICV, which is the encryption algorithm and IV/ICV lengths intended for the final EDITH product.

TABLE. 6 compares the overhead of the EDITH prototype, final EDITH design, and IPsec when imposing two layers of encryption. The red network is the original, unencrypted packet. The gray network has a single layer of encryption, and the black network has two layers.

Wireshark network packet capture and analyzer was used to monitor packets in the Monitor node of the testbed and at other nodes to verify the EDITH prototype overhead. Wireshark displays the total bytes captured in a packet, including the 14-byte Ethernet MAC header, and showed a total packet size of 1070 bytes (1056 in TABLE. 6 plus 14 bytes for Ethernet header) for the EDITH prototype encrypted UDP packet with header compression, which compares to 1146 bytes for IPsec, when the UDP packet has a payload of 1000 bytes of user data.

The prototype proved EDITH compression is effective and indistinguishable from normal IPsec packets for intermediary network equipment. Based on the prototype, it is proved that EDITH can be incorporated into CSfC MA CP compliant VPN products.

TABLE 6

Comparison of Prototype and Ideal EDITH Compression

| Station | Network | EDITH proto overhead | EDITH overhead | IPsec overhead |
| --- | --- | --- | --- | --- |
| Origin (IP/UDP) | red | 28 bytes | 28 bytes | 28 bytes |
| Inner (IPsec) | gray | 48 bytes | 40 bytes | 80 bytes |
| Outer (IPsec) | black | 56 bytes | 48 bytes | 132 bytes |

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
generating, by a first computer of an ad hoc network, a data packet containing a group destination address, wherein the group destination address comprises a multicast address or an anycast address;
generating, by the first computer, an encapsulated packet comprising the data packet as a payload;
encrypting, by the first computer executing inner encryption software, the encapsulated packet with an inner layer cryptographic key, the inner encryption software corresponding to first encryption software of a router device having a unicast address;
compressing, by the first computer, the encapsulated packet to according to an inner layer compression algorithm;
encrypting, by the first computer executing outer encryption software, the data packet with an outer layer cryptographic key, the outer encryption software corresponding to second encryption software of the router device having the unicast address;
compressing, by the first computer, the encapsulated packet according to an outer layer compression algorithm; and
transmitting, by the first computer, the encapsulated packet to the one or more target computers associated with the group destination address via the router device having the unicast destination address, wherein the first computer transmits the encapsulated packet to the one or more target computers using the unicast destination address associated with the router device, and wherein the first computer transmits via the router device having the unicast destination address the encapsulated packet through a non-secure path of one or more networks including a portion of the ad hoc network.

2. The method according to claim 1, further comprising appending, by the first computer, the unicast destination address associated with the router device to the encapsulated packet.

3. The method according to claim 1, further comprising executing, by the first computer, a software application configured to produce data for one or more data packets,
wherein the first computer generates the data packet based upon the data produced by executing the software application.

4. The method according to claim 1, further comprising transmitting, by the first computer, at least one encapsulated packet of a plurality of encapsulated packets of a packet flow having uncompressed header data to the one or more target computers.

5. The method according to claim 1, wherein compressing the encapsulated packet includes:
removing, by the first computer, from the encapsulated packet one or more header fields consistent over a packet flow of a plurality of encapsulated packets.

6. The method according to claim 1, wherein compressing the encapsulated packet includes:
re-encoding, by the first computer, one or more header fields of the encapsulated packet to reduce one or more field sizes, the one or more header fields inconsistent over a packet flow of a plurality of encapsulated packets.

7. The method according to claim 1, wherein the inner layer cryptographic key used by the first computer for the inner encryption software corresponds to a second inner layer cryptographic key of the router device.

8. The method according to claim 1, wherein the outer layer cryptographic key used by the first computer for the outer encryption software corresponds to a second outer layer cryptographic key of the router device.

9. The method according to claim 1, wherein the router device is a multicast router.

10. The method according to claim 1, wherein the first computer is a mobile device configured for network communication via the ad hoc network.

11. A system comprising:
a first computer and a router device having a unicast address, each comprising a corresponding processor configured to execute computer instructions stored in non-transitory machine-readable memory and communicate a plurality of data packets via an ad hoc network;
the first computer configured to:
generate a data packet containing a group destination address, wherein the group destination address comprises a multicast address or an anycast address;
generate an encapsulated packet comprising the data packet as a payload;
encrypt the encapsulated packet with an inner layer cryptographic key by executing inner encryption software corresponding to first encryption software of the router device;
compress the encapsulated packet to according to an inner layer compression algorithm;
encrypt the data packet with an outer layer cryptographic key by executing outer encryption software corresponding to second encryption software of the router device;
compress the encapsulated packet to according to an outer layer compression algorithm; and
transmit the encapsulated packet to one or more target computers associated with the group destination address via the router device having the unicast destination address, wherein the first computer transmits the encapsulated packet to the one or more target computers using the unicast destination address associated with the router device, and wherein the first computer transmits via the router device having the unicast destination address the encapsulated packet through a non-secure path of one or more networks including a portion of the ad hoc network.

12. The system according to claim 11, wherein the first computer is further configured to:
append the unicast destination address associated with the router device to the encapsulated packet.

13. The system according to claim 11, wherein the first computer is further configured to execute a software application configured to produce data for one or more data packets,
wherein the first computer generates the data packet based upon the data produced by executing the software application.

14. The system according to claim 11, wherein the first computer is further configured to:

transmit at least one encapsulated packet of a plurality of encapsulated packets of a packet flow having uncompressed header data to the one or more target computers.

15. The system according to claim 11, wherein, when compressing the encapsulated packet, the first computer is configured to:
   remove from the encapsulated packet one or more header fields consistent over a packet flow of a plurality of encapsulated packets.

16. The system according to claim 11, wherein, when compressing the encapsulated packet, the first computer is configured to:
   re-encode one or more header fields of the encapsulated packet to reduce one or more field sizes, the one or more header fields inconsistent over a packet flow of a plurality of encapsulated packets.

17. The system according to claim 11, wherein the inner layer cryptographic key used by the first computer for the inner encryption software corresponds to a second inner layer cryptographic key of the router device.

18. The system according to claim 11, wherein the outer layer cryptographic key used by the first computer for the outer encryption software corresponds to a second outer layer cryptographic key of the router device.

19. The system according to claim 11, wherein the router device is a multicast router.

20. The system according to claim 11, wherein the first computer is a mobile device configured for network communication via the ad hoc network.

* * * * *